United States Patent
Joubert Des Ouches et al.

(10) Patent No.: US 11,346,499 B1
(45) Date of Patent: May 31, 2022

(54) CONTAINERS AND METHODS FOR PROTECTING PRESSURE VESSELS

(71) Applicant: Helicoid Industries Inc., Indio, CA (US)

(72) Inventors: Pascal Joubert Des Ouches, Coublevie (FR); Lorenzo Mencattelli, London (GB); Chadwick Wasilenkoff, Indio, CA (US)

(73) Assignee: Helicoid Industries Inc., Indio, CA (US)

(*) Notice: Subject to any disclaimer, the term of this patent is extended or adjusted under 35 U.S.C. 154(b) by 0 days.

(21) Appl. No.: 17/340,568

(22) Filed: Jun. 7, 2021

Related U.S. Application Data

(60) Provisional application No. 63/195,295, filed on Jun. 1, 2021.

(51) Int. Cl.
*F17C 1/06* (2006.01)

(52) U.S. Cl.
CPC ........ *F17C 1/06* (2013.01); *F17C 2201/0109* (2013.01); *F17C 2201/0128* (2013.01);
(Continued)

(58) Field of Classification Search
CPC ...... F17C 1/06; F17C 1/04; F17C 1/02; H01F 41/086
(Continued)

(56) References Cited

U.S. PATENT DOCUMENTS

| | | | |
|---|---|---|---|
| 4,405,076 A | 9/1983 | Lines, Jr. et al. | |
| 5,225,812 A | * 7/1993 | Faghri | G01M 3/186 220/900 |

(Continued)

FOREIGN PATENT DOCUMENTS

| | | |
|---|---|---|
| CA | 2309948 A1 | 6/1999 |
| CA | 2804876 C | 5/2018 |

(Continued)

OTHER PUBLICATIONS

"9T Labs raises $4.3 million to advance carbon fiber 3D printing," published on line on Feb. 1, 2020, https://www.3dnatives.com/en/9t-labs-raises-4-3-million-010220205/, (3 pages), retrieved Jun. 15, 2021.

(Continued)

*Primary Examiner* — Robert J Hicks
(74) *Attorney, Agent, or Firm* — Eversheds Sutherland (US) LLP; Christopher C. Bolten

(57) ABSTRACT

A container includes first and second hollow shells respectively including first and second inner surfaces to receive a portion of a pressure vessel (PV). The first hollow shell includes a fiber layer that is and at least partially impregnated with resin, and an energy dissipating material that is substantially concentric with the first inner surface and disposed between the first inner surface and the fiber layer. The second hollow shell includes a fiber layer that is at least partially impregnated with resin, and an energy dissipating material that is substantially concentric with the second inner surface and disposed between the second inner surface and the second fiber layer. The first and second hollow shells are attachable to one another to define a volume for at least partially enclosing the PV.

30 Claims, 13 Drawing Sheets

(52) U.S. Cl.
CPC .......... *F17C 2201/0142* (2013.01); *F17C 2203/0624* (2013.01); *F17C 2203/0656* (2013.01); *F17C 2203/0673* (2013.01); *F17C 2209/2163* (2013.01); *F17C 2209/232* (2013.01); *F17C 2221/012* (2013.01)

(58) Field of Classification Search
USPC ......... 220/590, 589, 588, 586, 62.19; 206/6; 242/438, 430
See application file for complete search history.

(56) References Cited

U.S. PATENT DOCUMENTS

| | | | |
|---|---|---|---|
| 5,437,450 A | 8/1995 | Akatsuka et al. | |
| 5,447,765 A * | 9/1995 | Crane | B29C 53/585 |
| | | | 242/430 |
| 5,476,189 A | 12/1995 | Duvall et al. | |
| 5,772,938 A | 6/1998 | Sharp | |
| 6,641,893 B1 | 11/2003 | Suresh et al. | |
| 7,270,209 B2 | 9/2007 | Suess | |
| 7,641,949 B2 | 1/2010 | DeLay et al. | |
| 7,874,937 B2 | 1/2011 | Chao | |
| 8,012,291 B2 | 9/2011 | Kisch et al. | |
| 8,074,826 B2 | 12/2011 | Cronin et al. | |
| 8,187,402 B2 | 5/2012 | Heinrich et al. | |
| 8,192,853 B2 | 6/2012 | Hilmas et al. | |
| 8,460,777 B2 | 6/2013 | Long | |
| 8,657,146 B2 * | 2/2014 | Schultheis | F16J 12/00 |
| | | | 220/586 |
| 8,728,263 B2 | 5/2014 | Velicki et al. | |
| 8,932,695 B1 * | 1/2015 | Villarreal | F17C 1/06 |
| | | | 428/36.91 |
| 8,986,810 B2 | 3/2015 | Grunden et al. | |
| 9,114,588 B2 | 8/2015 | Oefner | |
| 9,199,429 B2 | 12/2015 | Tsai | |
| 9,296,174 B2 | 3/2016 | Tsai et al. | |
| 9,343,734 B2 | 5/2016 | Hwang et al. | |
| 9,452,587 B2 | 9/2016 | Kisailus et al. | |
| 9,822,228 B2 | 11/2017 | Arai et al. | |
| 10,099,445 B2 | 10/2018 | Kismarton | |
| 10,247,523 B2 | 4/2019 | Christoph et al. | |
| 10,472,472 B2 | 11/2019 | Wilenski et al. | |
| 10,576,335 B2 | 3/2020 | Greaney et al. | |
| 10,589,474 B2 | 3/2020 | Tsai et al. | |
| 10,603,873 B2 | 3/2020 | Garcia et al. | |
| 10,604,226 B2 | 3/2020 | May et al. | |
| 10,632,353 B2 | 4/2020 | Mordasini et al. | |
| 2008/0145647 A1 | 6/2008 | Ganguli et al. | |
| 2009/0140098 A1 | 6/2009 | Lengsfeld et al. | |
| 2010/0099513 A1 | 4/2010 | Chao et al. | |
| 2010/0282404 A1 | 11/2010 | Ellis | |
| 2012/0048865 A1 * | 3/2012 | Eihusen | F17C 13/002 |
| | | | 220/586 |
| 2014/0099484 A1 | 4/2014 | Roberts, III et al. | |
| 2014/0335300 A1 | 11/2014 | Tsai | |
| 2016/0009368 A1 | 1/2016 | Kismarton | |
| 2016/0031182 A1 | 2/2016 | Quinn et al. | |
| 2017/0028652 A1 | 2/2017 | Garcia Nieto et al. | |
| 2018/0148154 A1 | 5/2018 | Pastor et al. | |
| 2018/0162101 A1 | 6/2018 | Stickler et al. | |
| 2019/0128475 A1 * | 5/2019 | Roland | F17C 1/14 |
| 2019/0263532 A1 | 8/2019 | Wilenski et al. | |
| 2021/0123568 A1 | 4/2021 | Kronholz et al. | |

FOREIGN PATENT DOCUMENTS

| | | | |
|---|---|---|---|
| CN | 101524903 A | 9/2009 | |
| CN | 101633254 A | 1/2010 | |
| CN | 102145553 A | 8/2011 | |
| CN | 102336034 A | 2/2012 | |
| CN | 103818606 A | 5/2014 | |
| CN | 104943185 A | 9/2015 | |
| CN | 104985902 A | 10/2015 | |
| CN | 204845063 U | 12/2015 | |
| CN | 105235295 A | 1/2016 | |
| CN | 105667057 A | 6/2016 | |
| CN | 205854774 U | 1/2017 | |
| CN | 106739192 A | 5/2017 | |
| CN | 106739237 A | 5/2017 | |
| CN | 107187124 A | 9/2017 | |
| CN | 107187131 A | 9/2017 | |
| CN | 107891631 A | 4/2018 | |
| CN | 108832156 A | 11/2018 | |
| CN | 110145984 A | 8/2019 | |
| CN | 209700003 U | 11/2019 | |
| DE | 202015004314 U1 | 8/2015 | |
| DE | 102015225348 A1 | 6/2017 | |
| DE | 102016216310 A1 | 3/2018 | |
| EP | 1029195 B1 | 4/2003 | |
| EP | 2110056 A1 | 10/2009 | |
| EP | 2154416 A1 | 2/2010 | |
| KR | 20100113865 A | 10/2010 | |
| KR | 20160120247 A | 10/2016 | |
| KR | 102247198 B1 | 4/2021 | |
| WO | WO-2006037083 A2 | 4/2006 | |
| WO | WO-2007083641 A1 | 7/2007 | |
| WO | WO-2007136755 A2 | 11/2007 | |
| WO | WO-2008018421 A1 | 2/2008 | |
| WO | WO-2008098771 A1 | 8/2008 | |
| WO | WO-2008098900 A2 | 8/2008 | |
| WO | WO-2008141687 A2 | 11/2008 | |
| WO | WO-2009058500 A1 | 5/2009 | |
| WO | WO-2009127852 A1 | 10/2009 | |
| WO | WO-2010058196 A1 | 5/2010 | |
| WO | WO-2010065330 A1 | 6/2010 | |
| WO | WO-2010144010 A1 | 12/2010 | |
| WO | WO-2011090396 A1 | 7/2011 | |
| WO | WO-2011107733 A2 | 9/2011 | |
| WO | WO-2011121340 A1 | 10/2011 | |
| WO | WO-2011128667 A1 | 10/2011 | |
| WO | WO-2012024023 A1 | 2/2012 | |
| WO | WO-2012060971 A1 | 5/2012 | |
| WO | WO-2012091897 A1 | 7/2012 | |
| WO | WO-2012096696 A1 | 7/2012 | |
| WO | WO-2012126897 A1 | 9/2012 | |
| WO | WO-2013004671 A1 | 1/2013 | |
| WO | WO-2013135515 A1 | 9/2013 | |
| WO | WO-2013162989 A1 | 10/2013 | |
| WO | WO-2013173035 A1 | 11/2013 | |
| WO | WO-2014001652 A1 | 1/2014 | |
| WO | WO-2014009314 A1 | 1/2014 | |
| WO | WO-2014011293 A2 | 1/2014 | |
| WO | WO-2014026448 A1 | 2/2014 | |
| WO | WO-2014071306 A1 | 5/2014 | |
| WO | WO-2014085802 A1 | 6/2014 | |
| WO | WO-2014088962 A1 | 6/2014 | |
| WO | WO-2014099149 A1 | 6/2014 | |
| WO | WO-2014151658 A1 | 9/2014 | |
| WO | WO-2014197039 A2 | 12/2014 | |
| WO | WO-2015017006 A1 | 2/2015 | |
| WO | WO-2015044099 A1 | 4/2015 | |
| WO | WO-2015047480 A2 | 4/2015 | |
| WO | WO-2015073537 A1 | 5/2015 | |
| WO | WO-2015088594 A1 | 6/2015 | |
| WO | WO-2015091794 A1 | 6/2015 | |
| WO | WO-2015095396 A1 | 6/2015 | |
| WO | WO-2015167630 A1 | 11/2015 | |
| WO | WO-2015188963 A1 | 12/2015 | |
| WO | WO-2016020414 A1 | 2/2016 | |
| WO | WO-2016048885 A1 | 3/2016 | |
| WO | WO-2016154089 A1 | 9/2016 | |
| WO | WO-2016193758 A1 | 12/2016 | |
| WO | WO-2017027598 A1 | 2/2017 | |
| WO | WO-2017048975 A1 | 3/2017 | |
| WO | WO-2017095810 A1 | 6/2017 | |
| WO | WO-2017103669 A1 | 6/2017 | |
| WO | WO-2017117083 A1 | 7/2017 | |
| WO | WO-2017117383 A1 | 7/2017 | |
| WO | WO-2017180387 A1 | 10/2017 | |
| WO | WO-2017207611 A1 | 12/2017 | |
| WO | WO-2018093520 A2 | 5/2018 | |
| WO | WO-2018132360 A1 | 7/2018 | |
| WO | WO-2018187186 A1 | 10/2018 | |

(56) References Cited

FOREIGN PATENT DOCUMENTS

| WO | WO-2019031589 A1 | 2/2019 |
|---|---|---|
| WO | WO-2019133463 A1 | 7/2019 |
| WO | WO-2019203893 A2 | 10/2019 |

OTHER PUBLICATIONS

Abir et al., "On the improved ballistic performance of bio-inspired composites," Composites Part A: Applied Science and Manufacturing, 123:59-70 (Aug. 2019).
Abrate. S. "Impact on laminated composite materials," Applied Mechanics Review, 44(4):155-190, (Apr. 1991).
Adams et al., Elastomeric Tooling, ASM Handbook, 21:445-449 (2001).
Advani et al., "Process Modeling," ASM Handbook, 21:423-433, (2001).
Agarwal, et al., "Impact-Resistant and Tough Heiicoidally Aligned Ribbon Reinforced Composites with Tunable Mechanical Properties via Integrated Additive Manufacturing Methodologies," ACS Appl. Polym. Mater., 2(8):3491-3504 (Jul. 2020).
Ali-Sawalmih, et al., "Microtexture and Chitin/Calcite Orientation Relationships in the Mineralized Exoskeleton of the American Lobster," Adv. Funct. Mater., 18(20):3307-3314 (Oct. 2008).
Amacher, et al., "Thin Ply Composites: Experimental Characterization and Modeling," The 19th International Conference of Composite Material, Canada, Jul. 28-Aug. 2, 2013, 13 Pages.
Amorim, et al., "Bioinspired approaches for toughening of fiber reinforced polymer composites," Materials and Design, p. 109336 (Nov. 2020).
Andresen et al., Open Molding: Hand Lay-Up and Stray-Up, AMS Handbook, 21:450-456 (2001).
Apichattrabrut et al., "Helicoid Composites," Mechanics of Advances Materials and Structures, 13:61-76 (Aug. 2006).
Armstrong, K.B., "Worldwide Repair Standardization," ASM Handbook, 21:931-933 (2001).
ASM International Committee, "Nondestructive Testing," ASM Handbook, 21:699-725, (2001).
Astrom, B.T., "Introduction to Manufacturing of Polymer-Matrix Composites," ASM Handbook, 21:421-422 (2001).
Astrom, B.T. "Thermoplastic Composites Manufacturing," ASM Handbook, 21:570-578 (2001).
Basso, et al., "Tube Rolling," ASM Handbook, 21:565-569 (2001).
Belingardi et al., "Material characterization and impact performance of Semi Impregnated Micro-Sandwich structures, SIMS," Politenico di Torino, 26 Pages.
Berenberg, B.J., "Computer Programs," ASM Handbook, 21:334-343 (2001).
"Bismaleimide Resins," ASM Handbook, 21:97-104 (2001).
Bootle, et al., "Design Guidelines," ASM Handbook, 21:388-395 (2001).
Boshers, C. "Design Allowables," ASM Handbook, 21:360-365 (2001).
Bouligand, Y. "Twisted Fibrous Arrangements in Biological Materials and Cholesteric Mesophases," Tissue & Cell, 4(2):189-217, (1972).
Bourell et al., "Rapid Prototyping," ASM Handbook, 21:383-387 (2001).
Boyle et al., "Epoxy Resins," ASM Handbook, 21:78-79 (2001).
Bugaj, S. "Constituent Materials Testing," ASM Handbook, 21:749-758 (2001).
Bullegas et al., "Towards quasi isotropic laminates with engineered fracture behaviour for industrial applications," Composites Science and Technology, 165:290-306, (Jul. 2018).
Campbell, F.C., "Introduction to Post-Processing and Assembly," ASM Handbook, 21:615 (2001).
Campbell, F.C., "Manufacturing Process for Advanced Composites," Elsevier Science Ltd, (ISBN: 1856174158), Chapters 1-7, (2004).
Campbell, F.C., "Manufacturing Process for Advanced Composites," Elsevier Science Ltd, (ISBN: 1856174158), Chapters 8-13, (2004).
Campbell, F.C., "Manufacturing Technology for Aerospace Structural Materials," 617 Pages, (2006).
Chang K. K., "Aramid Fibers," ASM Handbook, 21:41-45, (2001).
Chen, et al., "Spiry-layup model of Rutelidae cuticle," Computational Material Science, 30:517-522 (Feb. 2004).
Chen, et al., "Structure and mechanical properties of crab exoskeletons," Acta Biomaterialia, 4:587-596 (Jan. 2008).
Cheng, et al., "Image Analysis of two crustacean exoskeletons and implications of the exoskeletal microstructure on the mechanical behavior," J. of Materials Research, 23(11):2854-2872 (2008).
Cheng, et al., "Mechanical behavior of bio-inspired laminated composites," Composites: Part A, 42:211-220 (2011).
Cheng, et al., "Mechanics-based Analysis of Selected Features of the Exoskeletal Microstructure of Popillia Japonica," J. of Materials Research, 24(11):3253-3267 (2009).
Chesmar, E. "Product Reliability, in-Service Experience, and Lessons Learned," ASM Handbook, 21:934-946 (2001).
Chester, et al., "Bonded Repair of Metal Structures Using Composites," ASM Handbook, 21:922-930 (2001).
Chew, et al., "Improving the mechanical properties of natural fiber reinforced laminates composites through Biomimicry," Composite Structures, 258:113208 (2021).
Cole II, et al., "Maintainability Issues," ASM Handbook, 21:914-921 (2001).
Crawford, B., "Fatigue Properties and Quantitative Fractography of Metal-Matrix Composites," ASM Handbook, 21:994-999 (2001).
Cugnoni, et al., "Thin ply technology advantages: an overview of the TPT-TECA project," May 2013 (25 pages).
"Curing," ASM Handbook, 21:486-491 (2001).
Dallas, G. "Thermal Analysis," ASM Handbook, 21:973-976 (2001).
"Damping Properties," ASM Handbook 21:259-270 (2001).
Davis, J. R., "Applications of Ceramic-Matrix Composites," ASM Handbook, 21:1101-1110 (2001).
Dorworth, L.C., "Composite Tooling," ASM Handbook, 21:434-440 (2001).
Downs-Honey, et al., "Custom Sailing Yacht Design and Manufacturing," ASM Handbook, 21:457-465 (2001).
Drzal, L.T.., "interfaces and Interphases," ASM Handbook, 21:169-179 (2001).
Evans, D.O., "Fiber Placement," ASM Handbook, 21:477-479 (2001).
Evans T. H., "Development of an on-board compressed gas storage system for hydrogen powered vehicle applications," Graduate Theses, Dissertations, and Problem Reports, 4460 (2009).
"Fabrics and Preforms," ASM Handbook, 21:59-68 (2001).
Feilden, et al., "3D Printing Bioinspired Ceramic Composites," Scientific Reports, 7:13759 (Oct. 2017).
Fields, R. E., "Introduction to Testing and Certification," ASM Handbook, 21:733 (2001).
Fields, R. E., "Overview of Testing and Certification," ASM Handbook, 21:734-740 (2001).
Fischer, et al., "Crack driving force in twisted plywood structures," Acta Biomaterialia, 55:349-359, Apr. 2017.
Flanagan et al., "Instability Consideration," ASM Handbook, 21:290-294.
Foreman, et al., "An Integrated System for Improved Damage Resistance and Lightning Strike Protection in Composite Structures," 16th International Conference of Composite Materials, Jul. 8-13, 2007, (7 pages).
Gianaris N. J., "Automotive Applications," ASM Handbook, 21:1020-1028 (2001).
Gianaris, N. J., "Introduction to Recycling and Disposal of Composites," ASM Handbook, 21:1005 (2001).
Ginert, L.A., "Element and Subcomponent Testing," ASM Handbook, 21:778-793 (2001).
Ginzberg, et al., "Damage tolerance of bio-inspired helicoidal composites under low velocity impact," Composite Structures, 161:187-203 (2017).

(56) References Cited

OTHER PUBLICATIONS

Gnoli, et al., "Homogenization and Equivalent Beam Model for Fiber-Reinforced Tubular Profiles," Materials, 13:2069 (1-30), (Apr. 2020).
Goering, J., Out-of-Plane Analysis, ASM Handbook, 21:302-307 (2001).
Green, P.A., "Contest with deadly weapons: telson sparring in mantis shrimp (*Stamatopoda*)," Biol. Lett., 11:20150558 (4 Pages) (Aug. 2015).
Greenfeld, I., "Nested helicoids in biological microstructures," Nature Communications, 11:224 (2020).
Grimshaw, M. N., "Automated Tape Laying," ASM Handbook, 21:480-485 (2001).
Grunenfelder, et al., "Crustacean-Derived Biomimetic Components and Nanostructured composites," Small, 10(16):3207-3232, Aug. 2014.
Grunenfelder, L.K., "Bio-inspired impact-resistant composites," Acta Biomaterialia, 10:3997-4008 (Mar. 2014).
Guarin-Zapata, et al., "Bandgap tuning in bioinspired helicoidal composites," Journal of the Mechanics and Physics of Solids, 131:344-357 (Jul. 2019).
Guillermin, O., "Computer-Aided Design and Manufacturing," ASM Handbook, 21:366-372 (2001).
Han, et al., "Mechanical properties of a novel dactyl-inspired green-composite sandwich structures with basalt fiber," Journal of Sandwich Structures & Materials, 1-11 (2019).
Han, et al., "Study on impact resistance behaviors of a novel composite laminate with basalt fiber for helicoidal-sinusoidal bionic structure of dactyl club of mantis shrimp," Composites Part B, 191:107976 (11 Pages) (Mar. 2020).
Harrigan, Jr. W.C., "Extrusion of Particle-Reinforced Aluminum Composites," ASM Handbook, 21:666-667 (2001).
Harrigan, Jr. W.C., "Quality Assurance of Metal-Matrix Composites.," ASM Handbook, 21:726-730 (2001).
Hart-Smith, L.J., "Bolted and Bonded Joints," ASM Handbook, 21:271-289 (2001).
Hart-Smith, L.J., "Designing for Reparability," ASM Handbook, 21:872-884 (2001).
Hayes, B.S., "Microscopy," ASM Handbook, 21:964-972 (2001).
Hazzard, M.K., "Effect of fiber orientation on the low velocity impact response of thin Dyneema composite laminates," International Journal of Impact Engineering, 100:35-45 (2017).
Heider, et al., "Cure Monitoring and Control," ASM Handbook, 21:692-698 (2001).
Henshaw, J.M., "Recycling and Disposal of Polymer-Matrix Composites," ASM Handbook, 21:1006-1012 (2001).
Henson III, G.A., "Introduction to Quality Assurance," ASM Handbook, 21:677-678 (2001).
Heslehurst, R.B., "Repair Engineering and Design Considerations," ASM Handbook, 21:885-892 (2001).
Hoebergen, et al., "Vacuum Infusion," ASM Handbook, 21:501-515 (2001).
Hoeckelman, L.A., "Environmental Protection and Sealing," ASM Handbook, 21:659-665 (2001).
Hoke, M. J., "Introduction to Product Reliability, Maintainability, and Repair," ASM Handbook, 21:871 (2001).
Hoke, M. J., "Repair Applications, Quality Control, and Inspection," ASM Handbook, 21:893-898 (2001).
Hundley, et al., "Multi-Scale Modeling of Metal-Composite Interfaces in Titanium-Graphite Fiber Metal Laminates Part I: Molecular Scale," Open Journal of Composite Materials, 1 (1):19-37, (Oct. 2011).
Hunt, W.H., "Automotive Applications of Metal-Matrix Composites," ASM Handbook, 21:1029-1032 (2001).
Jenkins, M.G., "Failure Analysis of Ceramic-Matrix Composites," ASM Handbook 21:1000-1002 (2001).
Jiang et al., "Low-velocity impact resistance behaviors of bio-inspired helicoidal composite laminates with non-linear rotation angle based layups," Composite Structures, 214:463-475 (Feb. 2019).
Johnson, L.B., "Protective Shells for Composite Overwrapped Pressure Vessels," Tech Briefs, https://www.techbriefs.com/component/content/article/tb/pub/techbriefs/materials/6742,4 pages (Feb. 2000).
Kamarudin, et al., "Effect of high Velocity Ballistic Impact on Pretensioned Carbon Fibre Reinforced Plastics (CFRP) Plates," Material Science and Engineering, 165:012005 1-7 (2017).
Karbhari, V. M., "Civil Infrastructure Applications," ASM Handbook, 21:1091-1100 (2001).
Karthikeyan et al., "Optimal fibre architecture of soft-matrix ballistic laminates," International Journal of Impact Engineering, 88:227-237 (2016).
Kearns, K.M., "Applications of Carbon-Carbon Composites," ASM Handbook, 21:1067-1070 (2001).
Kindinger, J., "Lightweight Structural Cores," ASM Handbook, 21:108-183 (2001).
Ko, F. K "Braiding," ASM Handbook, 21:69-77 (2001).
Korbelin, et al., "Damage tolerance and notch sensitivity of bio-inspired thin-ply Bouligand structures," Composites Part C: Open Access, 5:100146 1-14 (Apr. 2021).
Kress, G., "Design Criteria," ASM Handbook, 21:353-359 (2001).
Kuberski, L. F., "Machining, Trimming, and Routing of Polymer-Matrix Composites," ASM Handbook, 21:616-619 (2001).
Lautner, J., "Prepreg and Ply Cutting," ASM Handbook, 21:466-469 (2001).
Lewis III, Davis., "Post-Processing and Assembly of Ceramic-Matrix Composites," ASM Handbook, 21:668-674 (2001).
Li, N., Rapid Microwave Additive Manufacturing of Continuous Carbon Fiber Reinforced Bionic Plastics,: Proceedings of JEC Group's Fiber & Nano-Reinforced Materials Fill Gaps in Additive Manufacturing, (15 Pages), Jun. 2020.
Lim, et al., "Comparison of Tensile and Impact Absorption properties of Bio-Inspires Helicoidal stacked with Cross-Ply Stacked Carbon Fiber Laminate," Materials Science and Engineering, 744:012018, 8 Pages (2020).
Liu, et al., "Effects of inter-ply angles on the failure mechanics in bioinspired helicoidal laminates," Composites Science and Technology, 165"282-289 (Jul. 2018).
Liu, et al., "Bio-inspired Laminates of Different Material Systems," Journal of Applied Mechanics, 87:031007-1-031007-7 (Mar. 2020).
Liu, et al., "Healable bio-inspired helicoidal laminates," Composites Part A, 137:106024, 7 Pages (Jun. 2020).
Liu, et al., "Improving laminates through non-uniform inter-ply angles," Composites Part A, 127:105625, 9 Pages (Sep. 2019).
Liu, et al., "The response of bio-inspired helicoidal laminates to small projectile impact," International Journal of Impact Engineering 142:103608, 16 Pages (Apr. 2020).
"Macromechanics Analysis of Laminate Properties," ASM Handbook, 21:207-229 (2001).
Majumdar, B. S., "Engineering Mechanics and Analysis of Metal-Matrix Composites," ASM Handbook, 21:396-406 (2001).
McCarty, J. E., "Full-Scale Structural Testing," ASM Handbook, 21:794-800 (2001).
McCarville, et al., "Processing and Joining of Thermoplastic Composites," ASM Handbook, 21:633-645 (2001).
McCullough, C., "Continuous Fiber Reinforcement for Metal-Matrix Composites," ASM Handbook, 21:56-58 (2001).
McKague, L., "Thermoplastic Resins," ASM Handbook, 21:132-140 (2001).
Melaibari, et al., "Bio-inspired composite laminate design with improved out-of-plane strength and ductility," Composites Part A, 144:106362, 12 Pages, (Feb. 2021).
Mencattelli, et al., "Herringbone-Bouligand CFRP structures: A new tailorable damage-tolerant solution for damage containment and reduced delaminations," Composites Science and Technology, 190:108047, 1-13 (Jan. 2020).
Mencattelli, et al., "Realising bio-inspired impact damage-tolerant thin-ply CFRP Bouligand structures via promoting diffused sub-critical helicoidal damage," Composites Science & Technology, 182:107684, 1-13 (Jun. 2019).
Mencattelli, et al., "Ultra-thin-ply CFRP Bouligand bio-inspired structures with enhanced load-bearing capacity, delayed catastrophic failure and high energy dissipation capability," Composites Part A, 129:105655, 1-15 (2020).

(56) References Cited

OTHER PUBLICATIONS

"Micromechanics," ASM Handbook, 21:199-206 (2001).
Milliron, G., "Lightweight Impact-Resistance Composite Materials: Lessons from Mantis Shrimp," UC Riverside Electronic Theses and Dissertations, 143 Pages, (Sep. 2012).
Mills, A., "Manual Prepreg Lay-Up," ASM Handbook, 21:470-476 (2001).
Miracle, D. B., "Aeronautical Applications of Metal-Matrix Composites," ASM Handbook, 21:1043-4049 (2001).
Miracle, D.B., "ASM Handbook, vol. 21:Composites," ASM International, (portions missing), (ISBN:0-87170-703-9) Part 1 of 4, (2001).
Miracle, D.B., "ASM Handbook, vol. 21:Composites," ASM International, (portions missing), (ISBN:0-87170-703-9) Part 2 of 4, (2001).
Miracle, D.B., "ASM Handbook, vol. 21:Composites," ASM International, (portions missing), (ISBN:0-87170-703-9) Part 3 of 4, (2001).
Miracle, D.B., "ASM Handbook, vol. 21:Composites," ASM International, (portions missing), (ISBN:0-87170-703-9) Part 4 of 4, (2001).
Miracle, et al., "Introduction to Composites," ASM Handbook, 21:3-18 (2001).
Mitchell, et al., Cost Analysis,: ASM Handbook, 21:379-382 (2001).
Mo, et al., "Spatial programming of defect distributions to enhance material failure characteristics," Extreme Mechanics Letters, 34:100598, 1-8 (2020).
Moalli, J. E., "Failure Causes," ASM Handbook, 21:951-952 (2001).
"Molding Compounds," ASM Handbook, 21:141-149 (2001).
Mouritz, et al., "Ship Structure Repairs," ASM Handbook, 21:899-905 (2001).
Mouritz, et al., "Marine Applications," ASM Handbook, 21:1085-1090 (2001).
Moylan, J., "Lamina and Laminate Nonmechanical Testing," ASM Handbook, 21:759-765 (2001).
N12 NanoStitch TM, NanoStitch Interlaminar Reinforcement, YouTube, assessed on Feb. 5, 2021, ,URL:https://www.youtube.com/watch?v=og67m9v0mkM&feature=emb_ogo, 5 pages, (Mar. 2015).
Nebe, et al., "Analysis on the mechanical response of composite pressure vessel during internal pressure loading: FE modelling and experimental correlation," Composites Part B, 1-18 (2020).
Nieri, et al., "Semi impregnated micro-sandwich structures," Presented at the SAMPLE Europe 29th International Conference and Forum—SEICO 08, Mar. 31-Apr. 2, 8 Pages, (2008).
Nproxx, "Hydrogen tank train mountings," https://www.nproxx.com/hydrogen-tank-train-mountings/,2 Pages (Jul. 2019).
Nutt, S. R., "Introduction to Constituent Materials," ASM Handbook, 21:21-22 (2001).
O'Brien, T. K., "Fracture Mechanics of Composite Delamination," ASM Handbook, 21:241-245 (2001).
Ouyang, et al., "Identifying optimal rotating pitch angels in composites with Bouligand structure," Composites Communications, 23:100602, 1-5 (2021).
Paleen et al., "Hole Drilling in Polymer-Matrix Composites," ASM Handbook, 21:646-650 (2001).
Pandey, et al., "Metallic Matrices," ASM Handbook, 21:150-159 (2001).
Parker, R. T., "Mechanical Fastener Selection," ASM Handbook, 21:651-658 (2001).
Patek, et al., "Extreme impact and cavitation forces of a biological hammer: strike forces of the peacock mantis shrimp *Odontodactylus scyllarus*," The Journal of Experimental Biology, 208:3655-3664 (Aug. 2005).
Pepper, T., "Polyester Resins," ASM Handbook, 21:90-96 (2001).
Peters, S.T., "Filament Winding," ASM Handbook, 21:536-549 (2001).
Peterson, C.W., "Compression Molding," ASM Handbook, 21:516-535 (2001).
Petrak, D.R., "Ceramic Matrices," ASM Handbook, 21:160-163 (2001).
Pinto et al., "Bioinspired twisted composites based on Bouligand structures," Proceedings of SPIE, 9797:97970E-1-97970E-13 (Apr. 2016).
Plocher, et al., "Learning from nature: Bio-inspiration for Damage-tolerant high-performance fibre-reinforced composites," Composites Science and Technology, 208:108669, 1-30 (Jan. 2021).
"Sports and Recreation Equipment Applications," ASM Handbook, 21:1071-1077 (2001).
"Processing of Carbon-Carbon composites," ASM Handbook, 21:600-612 (2001).
"Processing of Metal-Matrix Composites," ASM Handbook, 21:579-588 (2001).
Pruett, J.G., "Carbon Matrices," ASM Handbook, 21:164-168 (2001).
Raabe, et al., "Microstructure and crystallographic texture of the chitin-protein network in the biological composite material of the exoskeleton of the lobster *Homarus americanus*," Materials Science and Engineering A, 421:143-153 (2006).
Raabe, et al., "The crustacean exoskeleton as an example of a structurally and mechanically graded biological nanocomposite material," Acta Materialia, 53:4281-4292 (May 2005).
Raphel, et al., "Bioinspired designs for shock absorption, based upon nacre and Bouligand structures," SN Applied Sciences, 1:1022, 12 Pages (Aug. 2019).
Rastogi, N., Finite Element Analysis, ASM Handbook, 21:321-333 (2001).
Rawal et al., "Space Applications," ASM Handbook, 21:1033-1042 (2001).
Reeve, S., "Introduction to Engineering, Mechanics, Analysis, and Design," ASM Handbook, 21:197-198 (2001).
Ribbans et al., "A bioinspired study on the interlaminar shear resistance of helicoidal fiber structures," Journal of the Mechanical Behavior of Biomedical Materials, 56:57-67 (2016).
Robitaille, S., "Cyanate Ester Resins," ASM Handbook, 21:126-131 (2001).
Rousseau, C., "Test Program Planning," ASM Handbook, 21:741-748 (2001).
Rudd, C.D., "Resin Transfer Molding and Structural Reaction Injection Molding," ASM Handbook, 21:492-500 (2001).
Ruffner, D.R., "Hygrothermal Behavior," ASM Handbook, 21:246-251 (2001).
Russell, J.D., "Resin Properties Analysis," ASM Handbook, 21:679-681 (2001).
Sawicki, A.J., "Testing and analysis Correlation," ASM Handbook, 21:344-352 (2001).
Schaff, J.R., "Fatigue and Life Protection," ASM Handbook, 21:252-258 (2001).
Scola, D.A., "Polyimide Resins," ASM Handbook, 21:105-119 (2001).
Serafini, et al., High-Temperature Applications, ASM Handbook, 21:1050-1056 (2001).
Shang, et al., "Crustacean-inspired helicoidal laminates," Composites Science and Technology, 128:222-232 (Apr. 2016).
Sloan, J., (editor), "Vitrimers: The reprocessable thermoset," Composites World, [article, online], [retrieved Feb. 4, 2021], retrieved from the Internet -<url:https://www.compositesworld.com/articles/vitrimers-the-reprocessable-thermoset</url:<a>—4 Pages, (Sep. 2020).
Smith, C.A., "Discontinuous Reinforcements for Metal-Matrix Composites," ASM Handbook, 21:51-55 (2001).
Stumpff, P.L., "Case Histories," ASM Handbook, 21:988-993 (2001).
Stumpff, P.L., "Failure Analysis Procedures," ASM Handbook, 21:953-957 (2001).
Stumpff, P.L., "Fractography," ASM Handbook, 21:977-987 (2001).
Stumpff, P.L., "Introduction to Failure Analysis," ASM Handbook, 21:949-950 (2001).
Stumpff, P.L., "Visual Analysis, Nondestructive Testing, and Destructive Testing," ASM Handbook, 21:958-963 (2001).
Suksangpanya, et al., "Crack twisting and toughening strategies in Bouligand architectures," International Journal of Solids and Structures, 150:83-106 (Apr. 2018).
Suksangpanya, et al., "Twisting cracks in Bouligand structures," Journal of the Mechanical Behavior of Biomedical Materials, 76:38-57 (Jun. 2017).
Sumerak, et al., "Pultrusion," ASM Handbook, 21:550-564 (2001).

(56) References Cited

OTHER PUBLICATIONS

Tan, et al., "A bioinspired study on the compressive resistance of helicoidal fibre structures," Proc. R. Soc. A, 473:20170538. 1-15 (Sep. 2017).
Tolle, et al., "Introduction to Applications," ASM Handbook, 21:1019 (2001).
"Tooling and Assembly Quality Control," ASM Handbook, 21:682-684 (2001).
Torres, et al., "Manufacture of green-Composites Sandwich Structures with Basalt Fiber and Bioepoxy Resin," Advances in Material Science and Engineering, 2013—Article ID 214506, 1-9 (May 2013).
Van West, B.P., "Reinforcing Material Lay-up Quality Control," ASM Handbook, 21:685-691 (2001).
Vargas-Gonzalez, et al., "Examining the Relationship Between Ballistic and Structural Properties of Lightweight Thermoplastic Unidirectional Composite Laminates," ARL-RP-0329, 1-18 (Aug. 2011).
Vargas-Gonzalez, et al., "Hybridized composite architecture for mitigation of nonpenetrating ballistic trauma," International Journal of Impact Engineering, 86:295-306 (Aug. 2015).
Vargas-Gonzalez, et al., "Impact and Ballistic Response of Hybridized Thermoplastic laminates," ARL-MR-0769, 1-26 (Feb. 2011).
Vizzini, A.J., "Design, Tooling, and Manufacturing Interaction," ASM Handbook, 21:373-378 (2001).
Wallenberger, et al., "Glass Fibers", ASM Handbook, 21:27-34 (2001).
Walsh, P.J., "Carbon Fibers," ASM Handbook, 21:35-40 (2001).
Wang, et al., "Fiber reorientation in hybrid helicoidal composites," Journal of Mechanical Behavior of Biomedical Materials, 110:103914, 1-11 (Jun. 2020).
Ward, et al., "Analysis of Sandwich Structures," ASM Handbook, 21:308-320 (2001).
Weaver, et al., "The Stomatopod Dactyl Club: A Formidable Damage-Tolerant Biological Hammer," Science, 336(3086):1275-1280 (Jun. 2012).
Weaver, et al., "Unifying Design Strategies in Demosponge and Hexactinellid Skeletal Systems," The Journal of Adhesion, 86:72-95 (Feb. 2010).
Weiss, D., "Recycling and Disposal of Metal-Matrix Composites," ASM Handbook, 21:1013-1016 (2001).
Wilhelm, M., "Aircraft Applications," ASM Handbook, 21:1057-1066 (2001).
Wilson, et al., "Ceramic Fibers," ASM Handbook, 21:46-50 (2001).
Wishart, R., "Lamina and Laminate Mechanical Testing," ASM Handbook, 21:766-777 (2001).
Woodward, et al., "Damage Tolerance," ASM Handbook, 21:295-301 (2001).
Wool, et al., "Bio-Based Resins and Natural Fibers," ASM Handbook, 21:184-194 (2001).
Wu, et al., "Discontinuous fibrous Bouligand architecture enabling formidable fracture resistance with crack orientation insensitivity," PNAS, 117(27):15465-15472 (Jul. 2020).
Yang et al., "AFM Identification of Beetle Exocuticle: Bouligand Structure and Nanofiber Anisotropic Elastic Properties," Adv. Funct. Mater., 27:1603993 1-8 (2017).
Yang, et al., "Crack-driving force and toughening mechanism in crustacean-inspired helicoidal structures," International Journal of Solids and Structures, 208(209):107-118 (2021).
Yang et al., "Global sensitivity analysis of low-velocity impact response of bio-inspired helicoidal laminates," International Journal of Mechanical Science, 187:106110, 1-11 (Sep. 2020).
Yang et al., "Impact and blast performance enhancement in bio-inspired helicoidal structures: A numerical study," Journal of the Mechanics and Physics of Solids, 142:104025, 1-17 (May 2020).
Yang, et al., "The role of ply angle in interlaminar delamination properties of CFRP laminates," Mechanics of Materials, 1-32 (May 2021).
Yaraghi, et al., "A Sinusoidally Architected Helicoidal Biocomposite," Adv. Mater., 28:6835-6844 (2016).

Yaraghi, et al., "The Stomatopod Telson: Convergent Evolution in the Development of a Biological Shield," Adv. Funct. Mater., 29:1902238, 1-13 (2019).
Yin, et al., "Toughening mechanism of coelacanth-fish-inspired double-helicoid composites," Composites science and Technology, 205:108650, 1-8 (Jan. 2021).
Zaheri, et al., "Revealing the Mechanics of Helicoidal Composites through Additive Manufacturing and Beetle Development Stage Analysis," Adv. Funct. Mater., 28:1803073, 1-11 (May 2018).
Zhang, et al., "Ballistic impact response of Ultra-High-Molecular-Weight Polyethylene (UHMWPE)," Composite Structures, 133:191-201 (Jul. 2015).
Zhang, et al., "Effects of Curvature and Architecture on Ballistic Performance of UHMWPE Helmets," Proceedings of the ASME 2019 International Mechanical Engineering Congress and Exposition IMECE2019, IMECE2019-11566, 1-9 (Nov. 2019).
Zhang et al., "Uncovering three-dimensional gradients in fibrillar orientation in an impact-resistant biological armour," Scientific Reports, 6:26249, 1-13 (Apr. 2016).
Zok, F.W., "Fracture Analysis of Fiber-Reinforced Ceramic-Matrix Composites," ASM Handbook, 21:407-418 (2001).
Zorzetto, et al., "Wood-Inspired 3D-Printed Helical Composites with Tunable and Enhanced Mechanical Performance," Adv. Funct. Mater., 29-1805888, 1-9 (2019).
Zureick et al., "Rehabilitation of Reinforced Concrete Structures Using Fiber-Reinforced Polymer Composites," ASM Handbook, 21:906-913 (2001).
Zweben, C., "Thermal Management and Electronic Packaging Applications," ASM Handbook, 21:1078-1084 (2001).
Zympeloudis, et al., "CMTS (Continuous Multi-Tow Shearing) for High-vol. Production of Complex Composite Parts," University of Bristol, Engineering and Physical Science Research Council, [slides, online], [retrieved Feb. 5, 2021], retrieved from Internet http://www.bristol.ac.uk/media-library/sites/composites/documents/cdt/conference/2016/evangelos-zympeloudis.pdf, 10 Pages, (Jun. 2016).
ASTM International "Standard Test Method for Measuring the Damage Resistance of a Fiber-Reinforced Polymer Matrix Composites to a Drop-Weight Impact Event," Astm D7136/D7136M-15, 16 Pages (Mar. 2015).
"D30 Impact Protection—Nothing protects better that D30," https://www.d3o.com, retrieved Feb. 5, 2021 (6 pages).
Gao, et al., "Spiral interface: A reinforcing mechanism for laminated composite materials learned from nature," Journal of Mechanics and Physics of Solids, 109:252-263 (Sep. 2017).
Guarin-Zapata, et al., "Shear Wave Filtering in Naturally-Occurring Bouligand Structures," Acta Biomaterialia, 19 Pages, (May 2015).
Hart-Smith, et al., "Characterizing Strength from a Structural Design Perspective," ASM Handbook, 21:230-240 (2001).
JEC Group, "Printing continuous fiber in true 3D," https://www.jeccomposites.com/knowledge/internationa-composites-news/printing-continuous-carbon-fibre-true-3d., retrieve Feb. 5, 2021.
Liu, et al., "Failure mechanisms in bioinspired helicoidal laminates," Composites Science and Technology, 157:99-106, (Feb. 2018).
Logsdon, J. R., "Electroformed Nickel Tooling," ASM Handbook, 21:441-444 (2001).
The Markets: Pressure vessels, Composites World, https://www.compositesworld.com/articles/the-markets-pressure-vessels-2021,9 Pages, (2021).
Trimech Blog, "3D Printing Composite Materials: Micro Automated Fiber Placement," [blog, online], [retrieved Feb. 5, 2021], retrieved from the Internet, URL:https://blog.trimech.com/3d-printing-composite-materials-micro-automated-fiber-placement#:~:text=3D%20Printing%20Composite%20Materials%3A%20Micro%20Automated%20Fiber%20Placement,-By%20TriMech%20on&text=Automated%20Fiber%20Placement%20(AFP)%20is,also%20contains%20non%2Dmetallic%20fibers, 7Pages, (Feb. 2020).
Yin, et al., "Tough Nature-Inspired helicoidal Composites with Printing-Induced Voids," Cell Reports Physical Science, 100109:1-18 (Jul. 2020).

(56) References Cited

OTHER PUBLICATIONS

Invitation to Pay Additional Fees and Partial Search Report dated Feb. 16, 2022 in Int'l PCT Patent Appl. Serial No. PCT/US2021/036162.

* cited by examiner

CONTAINERS AND METHODS FOR PROTECTING PRESSURE VESSELS

CROSS-REFERENCE TO RELATED APPLICATIONS

This application claims the benefit of U.S. Provisional Patent Application No. 63/195,295, filed on Jun. 1, 2021 and entitled "Containers and Methods for Protecting Pressure Vessels," the entire contents of which are incorporated by reference herein.

FIELD

This application relates to pressure vessels.

BACKGROUND

Pressure vessels (PVs) are reservoirs configured to store fluids, such as liquids or gases, under pressure. The pressure may be substantially higher than ambient pressure, e.g., may exceed 200 bars. The fluid within the PV may be dangerous, either on its own or when under pressure. For example, some PVs may be used to store hydrogen at a pressure of about 700 bars. While it may be desirable to use pressurized hydrogen or other pressurized fuels as a fuel source, PVs that are used in vehicles (such as cars, trucks, airplanes, spacecraft, and the like) may undergo sudden movements, such as may be caused by a crash or sudden stop. If the PV fails, the resulting leak or explosion may be dangerous or even catastrophic. Accordingly, improved methods of protecting PVs are needed.

SUMMARY

Containers and methods for protecting pressure vessels are provided herein.

Under one aspect, a container for a pressure vessel is provided herein. The container may include a first hollow shell including a first inner surface configured to receive a first portion of the pressure vessel. The container may include a second hollow shell including a second inner surface configured to receive a second portion of the pressure vessel. The first hollow shell may include a first fiber layer that is substantially concentric with the first inner surface and is at least partially impregnated with a resin. The first hollow shell may include a first energy dissipating material that is substantially concentric with the first inner surface and is disposed between the first inner surface and the first fiber layer. The second hollow shell may include a second fiber layer that is substantially concentric with the second inner surface and is at least partially impregnated with a resin. The second hollow shell may include a second energy dissipating material that is substantially concentric with the second inner surface and is disposed between the second inner surface and the second fiber layer. The first and second hollow shells may be attachable to one another so as to define a volume for at least partially enclosing the pressure vessel.

In some examples, at least one of the first and second inner surfaces is at least partially cylindrical, at least partially spherical, at least partially conical.

Additionally, or alternatively, in some examples, at least one of the first and second inner surfaces is at least partially axisymmetric.

Additionally, or alternatively, in some examples, the first and second hollow shells define a volume for substantially enclosing the pressure vessel.

Additionally, or alternatively, in some examples, the first hollow shell defines a first half-cylinder, and the second hollow shell defines a second half-cylinder.

Additionally, or alternatively, in some examples, the first hollow shell defines a first bowl shape, and the second hollow shell defines a second bowl shape.

Additionally, or alternatively, in some examples, at least one of the first and second fiber layers includes a plurality of helical plies.

In some examples, the helical plies may be helicoidally arranged relative to one another. Optionally, a first one of the helical plies (i=1) includes a plurality of tows that are wound next to each other at an angle of $\theta_{i=1}$ relative to an axis. Optionally, a second one of the helical plies (i=2) includes a plurality of tows that are wound next to each other at an angle of $\theta_{i=2}$ relative to an axis. Optionally, $\theta_{i=2}$ differs from $\theta_{i=1}$ by about 1 to about 25 degrees.

In some examples, the helical plies include interwoven tows. Optionally, a first one of the helical plies (i=1) includes tows that are interwoven at angles of $(+\alpha_{i=1}+\theta_{i=1})$ and $(-\alpha_{i=1}+\theta_{i=1})$ relative to an axis. Optionally, a second one of the helical plies (i=2) includes tows that are interwoven at angles of $(+\alpha_{i=2}+\theta_{i=2})$ and $(-\alpha_{i=2}+\theta_{i=2})$ relative to an axis. Optionally, $\theta_{i=2}$ differs from $\theta_{i=1}$ by about 1 to about 25 degrees.

Additionally, or alternatively, in some examples, the first energy dissipating material defines the inner surface of the first hollow shell.

Additionally, or alternatively, in some examples, the first fiber layer defines an outer surface of the first hollow shell.

Additionally, or alternatively, in some examples, the second energy dissipating material defines the inner surface of the second hollow shell.

Additionally, or alternatively, in some examples, the second fiber layer defines an outer surface of the second hollow shell.

Additionally, or alternatively, in some examples, the first hollow shell further includes a third fiber layer that is substantially concentric with the first inner surface; and a third energy dissipating material that is substantially concentric with the first inner surface and is disposed between the first fiber layer and the third fiber layer.

Additionally, or alternatively, in some examples, the second hollow shell further includes a fourth fiber layer that is substantially concentric with the second inner surface; and a fourth energy dissipating material that is substantially concentric with the second inner surface and is disposed between the second fiber layer and the fourth fiber layer.

Additionally, or alternatively, in some examples, the first hollow shell includes a first helicoidally braided layer or woven fabric that is disposed between the first inner surface and the first fiber layer.

Additionally, or alternatively, in some examples, the second hollow shell includes a second helicoidally braided layer or woven fabric that is disposed between the second inner surface and the second fiber layer. Optionally, the resin of the first fiber layer at least partially impregnates the first helicoidally braided layer or woven fabric, or the resin of the second fiber layer at least partially impregnates the second helicoidally braided layer or woven fabric.

Additionally, or alternatively, in some examples, fibers of the first fiber layer and the second fiber layer independently include at least one material selected from the group consisting of: ultra-high molecular weight polyethylene (UHMWPE), para-aramid, carbon, graphite, glass, aramid, basalt, ultra-high molecular weight polypropylene (UHMWPP), a natural material, a metal, quartz, ceramic, and recycled fiber.

Additionally, or alternatively, in some examples, at least one of the first and second energy dissipating materials includes a foam. Optionally, the foam includes polyvinylchloride (PVC), expandable polyurethane (PU), expanded polystyrene (EPS), expanded polypropylene (EPP), polyethylene (PE), aluminum foam, radially oriented scaffolding 3D printed material, honeycomb structure, closed cell foam, open cell foam, viscoelastic gel, or defines a metamaterial.

Additionally, or alternatively, in some examples, the first fiber layer includes substantially the same composition as the second fiber layer.

Additionally, or alternatively, in some examples, the first fiber layer includes a different composition than the second fiber layer.

Additionally, or alternatively, in some examples, the first fiber layer includes substantially the same material configuration as the second fiber layer.

Additionally, or alternatively, in some examples, the first fiber layer includes a different material configuration than the second fiber layer.

Additionally, or alternatively, in some examples, the first energy dissipating material includes substantially the same composition as the second energy dissipating material.

Additionally, or alternatively, in some examples, the first energy dissipating material includes a different composition than the second energy dissipating material.

Additionally, or alternatively, in some examples, the first energy dissipating material includes substantially the same material configuration as the second energy dissipating material.

Additionally, or alternatively, in some examples, the first energy dissipating material includes a different material configuration than the second energy dissipating material.

Additionally, or alternatively, in some examples, the container further includes a first fastener attached to the first hollow shell; and a second fastener attached to the second hollow shell and configured to engage with the first fastener to attach the first hollow shell to the second hollow shell. Optionally, the first fastener includes a first thread and the second fastener includes a second thread configured to rotatably engage with the first thread. Optionally, the first fastener includes a toggle latch, pipe clamp, or bolted joint.

Additionally, or alternatively, any of the containers provided herein may include a sensor embedded within or between one or more layers of the container. Optionally, the sensor includes a piezoelectric sensor configured to monitor impact. Optionally, the sensor includes a fiber Bragg grating (FBG) configured to monitor for gas leaks.

Under another aspect, a method of protecting a pressure vessel is provided herein. The pressure vessel may have first and second portions. The method may include inserting the first portion of the pressure vessel into the first hollow shell of any of the containers provided herein. The method may include inserting the second portion of the pressure vessel into the second hollow shell of the container of any of the containers provided herein. The method may include attaching the first hollow shell to the second hollow shell.

Under another aspect, another method of protecting a pressure vessel is provided herein. The method may include overwrapping the pressure vessel with a plurality of helical plies. The helical plies may be helicoidally arranged relative to one another.

In some examples, a first one of the helical plies (i=1) includes a plurality of tows that are wound next to each other at an angle of $\theta_{i=1}$ relative to an axis. Optionally, a second one of the helical plies (i=2) includes a plurality of tows that are wound next to each other at an angle of $\theta_{i=2}$ relative to an axis. Optionally, $\theta_{i=2}$ differs from $\theta_{i=1}$ by about 1 to about 25 degrees.

In some examples, the helical plies include interwoven tows. Optionally, a first one of the helical plies (i=1) includes tows that are interwoven at angles of $(+\alpha_{i=1}+\theta_{i=1})$ and $(-\alpha_{i=1}+\theta_{i=1})$ relative to an axis. Optionally, a second one of the helical plies (i=2) includes tows that are interwoven at angles of $(+\alpha_{i=2}+\theta_{i=2})$ and $(-\alpha_{i=2}+\theta_{i=2})$ relative to an axis. Optionally, $\theta_{i=2}$ differs from $\theta_{i=1}$ by about 1 to about 25 degrees.

Under still another aspect provided herein, a method of making a container for a pressure vessel is provided. The method may include forming a first hollow shell, and forming a second hollow shell. The first hollow shell may be formed using steps including shaping a first energy dissipating material to form a first inner surface configured to receive a first portion of the pressure vessel; and forming a first fiber layer, at least partially impregnated with a resin, over the first energy dissipating material so as to be substantially concentric with the first energy dissipating material. The second hollow shell may be formed using steps including shaping a second energy dissipating material to form a second inner surface configured to receive a second portion of the pressure vessel; and forming a second fiber layer, at least partially impregnated with a resin, over the second energy dissipating material so as to be substantially concentric with the second energy dissipating material. The first hollow shell being attachable to the second hollow shell so as to at least partially enclose the pressure vessel.

Under yet another aspect provided herein, a pressure vessel is provided. The pressure vessel may include a plurality of helical plies. The helical plies may be helicoidally arranged relative to one another.

In some examples, a first one of the helical plies (i=1) includes a plurality of tows that are wound next to each other at an angle of $\theta_{i=1}$ relative to an axis. Optionally, a second one of the helical plies (i=2) includes a plurality of tows that are wound next to each other at an angle of $\theta_{i=2}$ relative to an axis. Optionally, $\theta_{i=2}$ differs from $\theta_{i=1}$ by about 1 to about 25 degrees.

In some examples, the helical plies include interwoven tows. Optionally, a first one of the helical plies (i=1) includes tows that are interwoven at angles of $(+\alpha_{i=1}+\theta_{i=1})$ and $(-\alpha_{i=1}+\theta_{i=1})$ relative to an axis. Optionally, a second one of the helical plies (i=2) includes tows that are interwoven at angles of $(+\alpha_{i=2}+\theta_{i=2})$ and $(-\alpha_{i=2}+\theta_{i=2})$ relative to an axis. Optionally, $\theta_{i=2}$ differs from $\theta_{i=1}$ by about 1 to about 25 degrees.

DETAILED DESCRIPTION

Containers and methods for protecting pressure vessels are provided herein.

As provided herein, PVs (such as hydrogen pressure vessels, HPVs) may be protected by partially or fully enclosing them within an impact resistant container, which may be referred to as a protective box or a crash box. The use of such a separate container may dissociate the pressure resistance function of the PV from the crash/impact resistance of the container. For example, such a container, may inhibit damage to the PV from impacts, such as from a crash or an external projectile. Because the container is separate from and encloses the PV, the structural designs of the container and the PV may be individually optimized, e.g., with different choices of fiber type, resin, and manufacturing process. In some examples herein, the container may be designed as a laminate structure including at least one external fiber composite shell (e.g., helicoidal composite shell) and at least one energy dissipating material, which may be referred to as a "core". The container may be formed in two or more parts so as to accommodate the insertion of the PV, and the parts may be attachable to one another so as to partially or fully enclose the PV therein, thus protecting it. As such, if the container becomes damaged, it may be readily replaced with another such container without the need to replace the PV, which may be cumbersome, expensive, and dangerous. In some examples herein, a damaged container may be repaired and then reused with the same or a different PV. In other examples herein, the PV itself may be overwrapped with a plurality of helical plies that are arranged helicoidally relative to one another, or the PV even may be formed using a plurality of helical plies that are arranged helicoidally relative to one another.

Figures 1A, 1B:
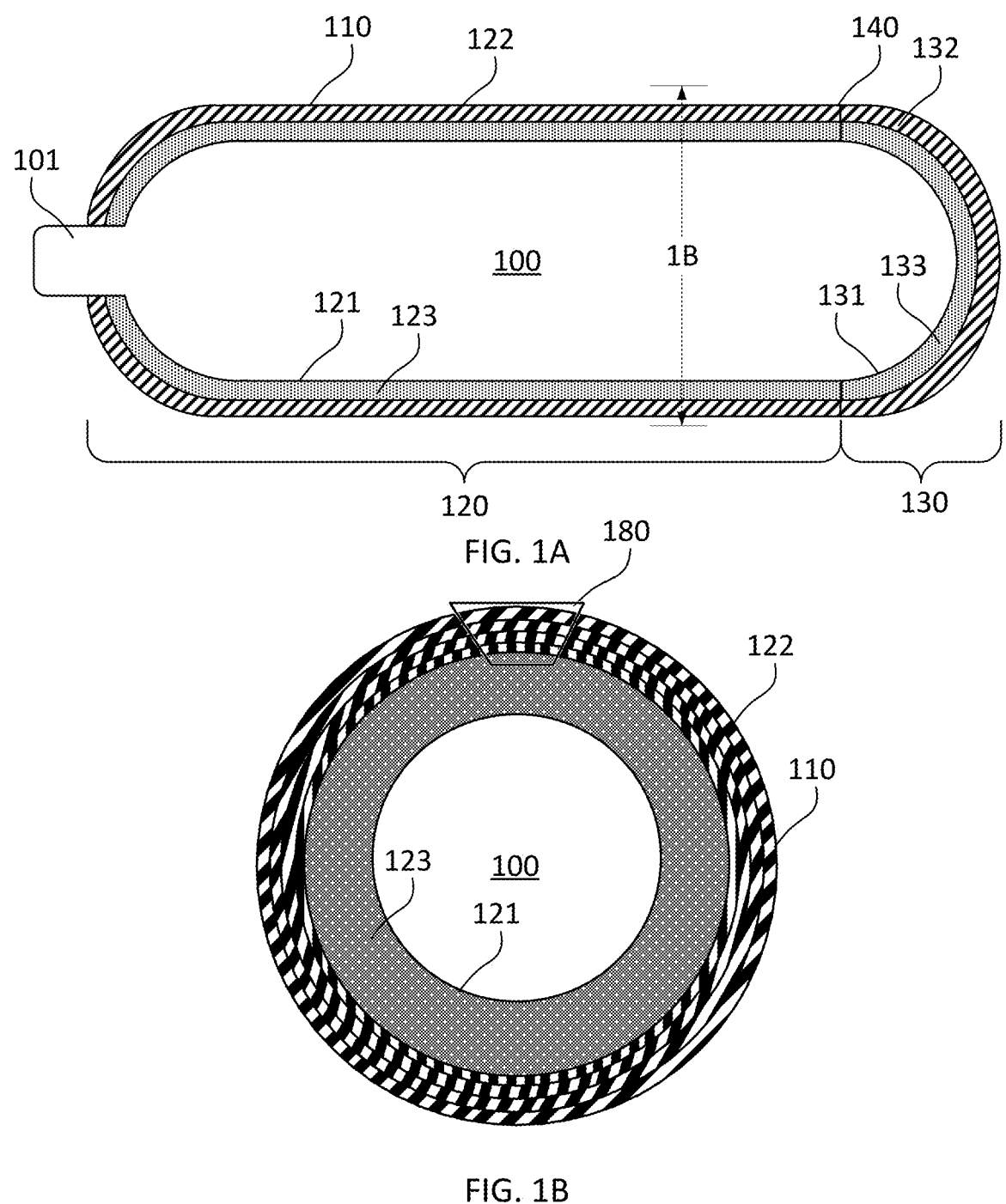
FIGS. 1A-1B schematically illustrate cross-sectional views of an example container for a pressure vessel (PV).

FIGS. 1A-1B schematically illustrate cross-sectional views of an example container 110 for a PV 100. Container 110 at least partially encloses PV 100, and in some examples substantially encloses or even fully encloses PV 100. As used herein, to "at least partially enclose" a PV is intended to mean that at least a portion of the PV is surrounded by a container. To "substantially enclose" a PV is intended to mean that a majority of the PV (e.g., more than 50%, more than 60%, more than 70%, more than 80%, more than 90%, more than 95%, more than 98%, or up to 99% of the PV) is surrounded by the container, while the balance of the PV (e.g., 1% or more) is not surrounded by the container. In the illustrated example, a neck portion 101 of PV 100 may protrude from container 110 such that the fluid within the PV may be used, while the balance of the PV may be enclosed within container 110. In this example, PV 100 may be considered to be substantially enclosed within container 110, because the main reservoir of PV 100 is completely enclosed within container 110, while another portion of PV 100 (here, the neck 101, or even only a portion of the neck) protrudes from the container. To "fully enclose" a PV is intended to mean that the entirety of the PV is surrounded by the container.

Container 110 may include a first hollow shell 120 and a second hollow shell 130. First hollow shell 120 may include a first inner surface 121 configured to receive a first portion of the pressure vessel 100. First hollow shell 120 may include a first fiber layer 122 that is substantially concentric with the first inner surface and is at least partially impregnated with a resin. First hollow shell 120 also may include a first energy dissipating material 123 that is substantially concentric with the first inner surface 121 and is disposed between the first inner surface 121 and the first fiber layer 122. Second hollow shell 130 may include a second inner surface 131 configured to receive a second portion of the pressure vessel 100. Second hollow shell 130 may include a second fiber layer 132 that is substantially concentric with the second inner surface 131 and is at least partially impregnated with a resin. Second hollow shell 130 also may include a second energy dissipating material 133 that is substantially concentric with the second inner surface and is disposed between the second inner surface and the second fiber layer. The first and second hollow shells 120, 130 may be attachable to one another so as to define a volume for at least partially enclosing the pressure vessel 100. In the nonlimiting example illustrated in FIG. 1A, first and second hollow shells 120, 130 meet one another at junction 140. Example structures for attaching hollow shells to one another are described with reference to FIGS. 2A-2B. It should be appreciated that use of labels such as "first," "second," and the like to refer to elements is not intended to imply any particular spatial relationship between those elements.

In the nonlimiting example illustrated in FIGS. 1A-1B, the first energy dissipating material 123 may define the inner surface 121 of the first hollow shell 120, and the first fiber layer 122 may define an outer surface of the first hollow shell. Similarly, the second energy dissipating material 133 may define the inner surface 131 of the second hollow shell 130, and the second fiber layer 132 may define an outer surface of the second hollow shell. However, such layers may have any suitable arrangement relative to one another and relative to the inner and outer surfaces of their respective hollow shells. Furthermore, the inner and outer surfaces may include any suitable combination of fiber layer(s), energy dissipating material(s), and/or other layers. Some additional, nonlimiting examples of alternative arrangements will be described with reference to FIGS. 4A-4B, 5, and 6. Example configurations of fiber layers, such as first fiber layer 122 are described further below with reference to FIGS. 3A-3C.

It will be appreciated that container 110, and other containers described elsewhere herein, may include any suitable combination of shapes suitable to at least partially enclose PV 100. Illustratively, the inner surface 121 of hollow shell 120 may be shaped so as to follow the form of, and contact, the respective portion of the outer surface of PV 100. Similarly, the inner surface 131 of hollow shell 130 may be shaped so as to follow the form of, and contact, the respective portion of the outer surface of PV 100. As such, different portions of the hollow shells 120, 130 may be shaped differently than one another, and may have any suitable cross-section. Illustratively, at least one of the first and second inner surfaces 121, 131 is at least partially cylindrical, at least partially spherical, or at least partially conical. In the nonlimiting example illustrated in FIG. 1A-1B, a portion of first inner surface 121 is cylindrical, while another portion of first inner surface 121 is spherical, and inner surface 131 is spherical. As such, the first hollow shell 120 may be considered to define a first bowl shape, and the second hollow shell 130 may be considered to define a second bowl shape. Other shapes readily may be envisioned so as to partially, substantially, or fully enclose PVs for use in any suitable context, such as in vehicles (cars, trucks, airplanes, spacecraft, and the like). In this regard, use of the term "substantially concentric" to describe the spatial relationship between two materials is intended to refer to those materials having shapes with substantially the same center as one another, rather than to imply that the materials necessarily have a particular shape of cross-section (e.g., cylindrical, conical, or spherical).

Figure 2A:
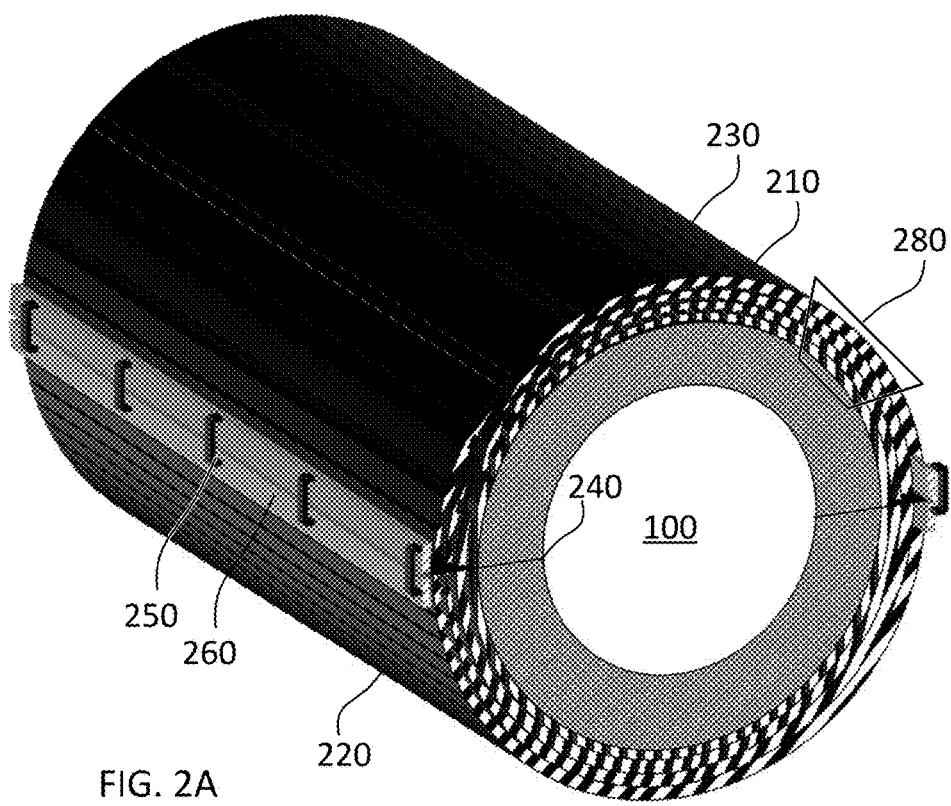
FIGS. 2A-2B schematically illustrate cross-sectional views of assembly of example containers about a PV.
Figure 2B:
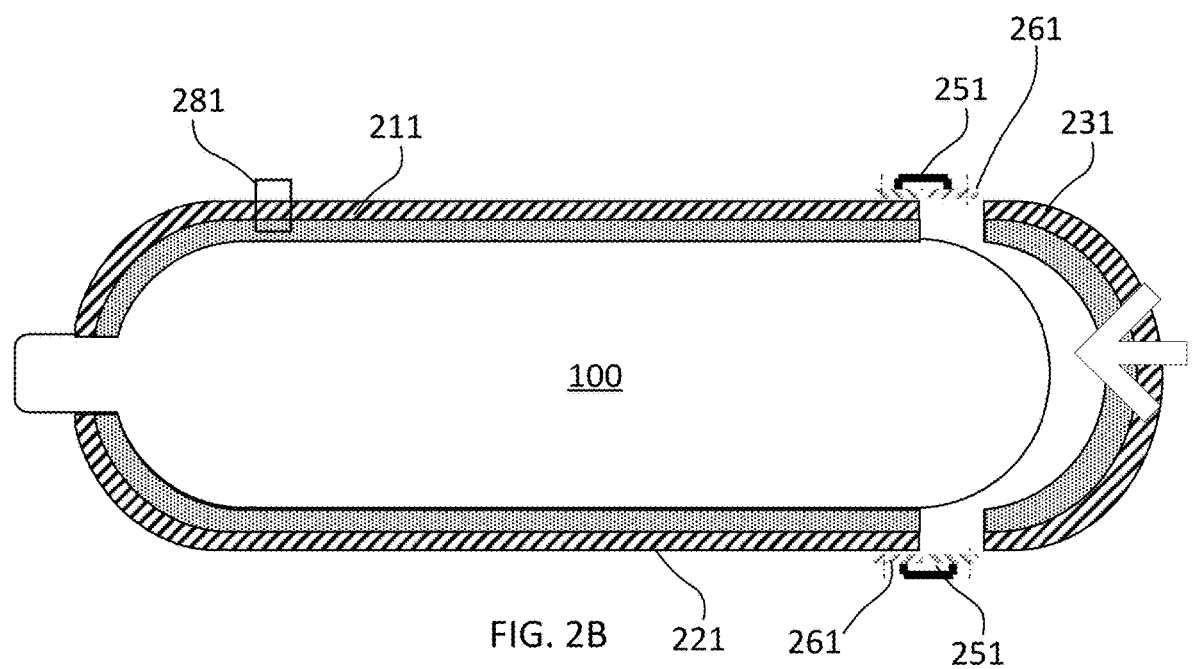

For example, FIGS. 2A-2B schematically illustrate cross-sectional views of assembly of example containers about a PV. In the nonlimiting example illustrated in FIG. 2A, container 210 includes a first hollow shell 220 that defines a first half-cylinder, and a second hollow shell 230 that defines a second half-cylinder. In the nonlimiting example illustrated in FIG. 2A, first and second hollow shells 220, 230 meet one another at junction 240. As such, the composite cross-section of container 210 may be substantially cylindrical in the region shown in FIG. 2A. Container 210 may be shaped differently in other regions (not specifically shown), if present.

Any suitable structure may be used to attach the first and second hollow shells to one another, e.g., to attach first and second hollow shells 120, 130 to one another, or to attach first and second hollow shells 220, 230 to one another. Illustratively, container 110 or 210 (or any other container provided herein) may include a first fastener attached to the first hollow shell; and a second fastener attached to the second hollow shell and configured to engage with the first fastener to attach the first hollow shell to the second hollow shell. For example, in container 210 illustrated in FIG. 2A, the first and second fasteners (collectively designated 250) may include respective portions of a toggle latch, pipe clamp, or bolted joint. Optionally, container 210 also may include padding 260 located about junction 240. As another example, container 211 illustrated in FIG. 2B may be configured similarly as container 110 illustrated in FIGS. 1A-1B, e.g., may include first hollow shell 220 configured similarly as first hollow shell 120, and may include second hollow shell 231 configured similarly as second hollow shell 130. PV 100 may be partially, substantially, or fully enclosed within container 211 by inserting the PV into first hollow shell 221, covering the PV's exposed end with second hollow shell 231, and securing the first and second hollow shells to one another using first and second fasteners. In container 211, the first and second fasteners (collectively designated 251) may include respective portions of a toggle latch, pipe clamp, or bolted joint, and may include padding 261. Alternatively, the first fastener may include a first thread and the second fastener may include second thread configured to rotatably engage with the first thread. That is, the first and second fasteners of container 211 may be configured such that second hollow shell 231 may be screwed onto first hollow shell 221 so as to define an internal volume that accommodates PV 100.

The first fiber layer of the first hollow shell (e.g., hollow shell 120, 220, or 221) may include one or more plies, each of which may have any suitable configuration. Similarly, the second fiber layer of the second hollow shell (e.g., hollow shell 130, 230, or 231) may include one or more plies, each of which may have any suitable configuration. The composition and material structure of the first fiber layer of the first hollow shell may be similar to, or may be different than, that of the second fiber layer of the second hollow shell. In some examples, the first fiber layer, the second fiber layer, or both the first and second fiber layers, may include a woven fabric, a braided layer, or one or more helical plies. As used herein, the term "woven fabric" is intended to mean an element formed by interlacing two or more tows at right angles to one another. As used herein, the term "tow" is intended to mean a flexible member that is elongated along a longitudinal axis of the tow, such as a thread, rope, filament, or tape. A tow may be monolithic or may include a plurality of fibers. In some examples, a tow may include a plurality of fibers that are at least partially impregnated with a resin and elongated along a longitudinal axis of the tow. As used herein, the term "braided layer" is intended to mean an element formed by interlacing three or more tows together at non-right angles to one another. As used herein, the term "helical," when referring to a ply, is intended to mean that the tows of the ply are arranged in a spiral within that ply. As used herein, the term "ply" is intended to mean a layer that is distinguishable, whether by composition or by material configuration, or both, from another layer. A ply may include one layer, or may include multiple layers.

Figure 3A:
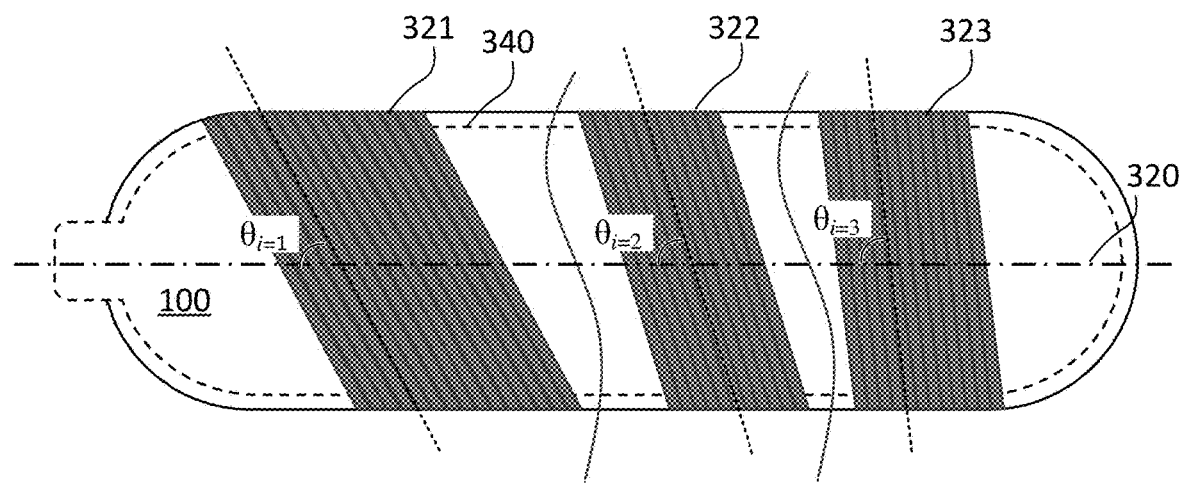
FIGS. 3A-3C schematically illustrate example configurations of different plies.
Figure 3B:
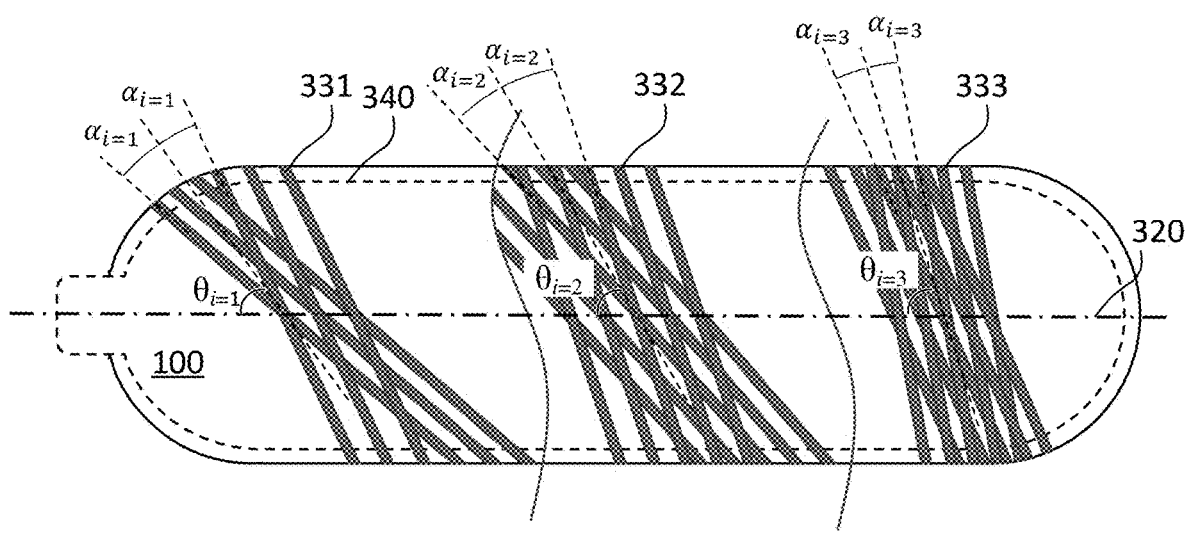
Figure 3C:
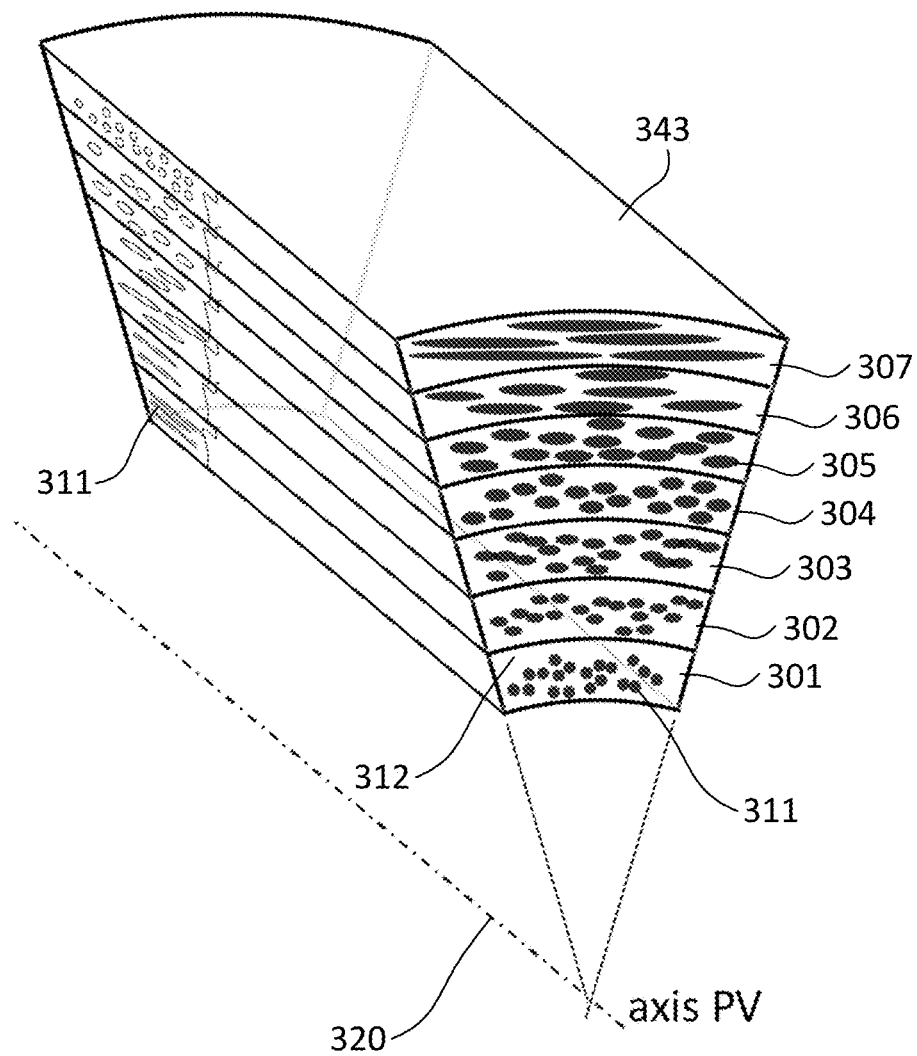

FIGS. 3A-3C schematically illustrate example configurations of different plies. In the nonlimiting example illustrated in FIG. 3A, plies 321, 322, 323 are located at a spaced distance from PV 100 (e.g., may be separated from PV 100 by an energy dissipating material or may be placed one next to each other to form a fiber layer). In the illustrated example, ply 321 may be the innermost most ply ("Ply 1") of the first fiber layer, ply 322 may be outside of ply 321 ("Ply 2"), and ply 323 may be the outermost ply ("Ply 3") of the first fiber layer, although it will be appreciated that the first fiber layer may include any suitable number of plies. Plies 321, 322, 323 each may be helical. As illustrated in FIG. 3A, the tows in each ply may be wound next to one another to form a single ply with a distinct ply orientation. For example, the tows of ply 321 (i=1) may be wound next to each other at an angle of $\theta_{i=1}$ relative to axis 320 of PV 100 (which axis may be coaxial with the inner surface 340 of the first hollow shell); the tows of ply 322 (i=2) may be wound next to each other at an angle of $\theta_{i=2}$ relative to axis 320; and the tows of ply 323 (i=3) may be wound next to each other at an angle of $\theta_{i=3}$ relative to the axis 320. Angles $\theta_{i=1}$, $\theta_{i=2}$, and $\theta_{i=3}$ indicate the fiber orientation of the tow with respect to a global reference axis (here, PV longitudinal axis 320). The differences between the tow orientation of adjacent plies, i.e. $\theta_{i=2}-\theta_{i=1}$, may be referred to as pitch angles. When the difference between the angles of adjacent plies $\theta_{i=2}-\theta_{i=1}$, $\theta_{i=3}-\theta_{i=2}$, $\theta_{i=4}-\theta_{i=3}$ are substantially the same as one another, the resulting plies may be referred to as having a constant pitch angle, and when such differences between adjacent ply orientations are different than one another, the resulting plies may be referred to as not having a constant pitch angle. For example, $\theta_{i=2}$ may differ from $\theta_{i=1}$ by about 1 to about 25 degrees, and $\theta_{i=3}$ may differ from $\theta_{i=2}$ by about 1 to about 25 degrees. As a result of such differences between angles $\theta_{i=1}$, $\theta_{i=2}$, and $\theta_{i=3}$, helical plies 321, 322, 323 may be helicoidally arranged relative to one another. Such a helicoidal arrangement may confer additional crash resistance to the container, and thus to PV 100. As used herein, a "helicoidal arrangement" or "helicoidal layup," when referring to a plurality of plies, is intended to mean that the tows of adjacent plies are arranged at different angles than one another to define a spiral. So, each of plies 321, 322, 323 may be helical, and the arrangement of plies 321, 322, 323 also may be helicoidal. As used herein, by "about" and "substantially" it is meant within ±10% of the stated value. Plies helicoidally arranged allow for a smooth inter-ply (pitch) angle transitions between adjacent plies. This results in a smooth transition in elastic properties, which reduce interlaminar shear stresses at the interface between plies. These stresses are responsible for the formation of delamination under impact event. Therefore, the helicoidal layup helps to delay, reduce, or inhibit the occurrence of damage. Additionally, the helicoidal layup is capable of dissipating energy, primarily via the formation of matrix damage. For example, cracks may grow and propagate along tortuous paths, following the local fiber orientation (spiraling cracks) and thus, leaving fibers mostly undamaged, leading to high energy dissipation, delayed, reduced, or inhibited catastrophic failure, and increased structural integrity. Cracks are able to follow the local fiber orientation during propagation hence inhibiting or preventing the fibers (critical load carrying component) from failing. This results in extensive damage diffusion at a sub-critical level (i.e. prior to penetration or substantial loss of stiffness), characterized by the formation of matrix splits and helicoidal distributions of delaminations.

Fiber layers may include still other arrangements of plies and/or of tows within plies. For example, FIG. 3B illustrates an example in which helical plies include interwoven tows. In the nonlimiting example illustrated in FIG. 3B, plies 331, 332, 333 of a first fiber layer of a first hollow member are located at a spaced distance from PV 100 (e.g., may be separated from PV 100 by an energy dissipating material). In the illustrated example, ply 331 may be the innermost most ply ("Ply 1") of the first fiber layer, ply 332 may be outside of ply 321 ("Ply 2"), and ply 333 may be the outermost ply ("Ply 3") of the first fiber layer, although it will be appreciated that the first fiber layer may include any suitable number of plies. Plies 331, 332, 333 each may be helical. For example, as illustrated in FIG. 3B, the tows of ply 331 (i=1) may be interwoven at angles of $(+\alpha_{i=1}+\theta_{i=1})$ and $(-\alpha_{i=1}+\theta_{i=1})$ relative to axis 320 of PV 100 (which may be coaxial with inner surface 340 of the first hollow shell); the tows of ply 332 (i=2) may be interwoven at angles of $(+\alpha_{i=2}+\theta_{i=2})$ and $(-\alpha_{i=2}+\theta_{i=2})$ relative to axis 320; and the tows of ply 333 (i=3) may be interwoven at angles of $(+\alpha_{i=3}+\theta_{i=3})$ and $(-\alpha_{i=3}+\theta_{i=3})$ relative to axis 320. Angles $\theta_{i=1}$, $\theta_{i=2}$, and $\theta_{i=3}$ may be different than one another. For example, $\theta_{i=2}$ may differ from $\theta_{i=1}$ by about 1 to about 25 degrees, and $\theta_{i=3}$ may differ from $\theta_{i=2}$ by about 1 to about 25 degrees. Angles $\alpha_{i=1}$, $\alpha_{i=2}$ and $\alpha_{i=3}$ may be different than one another. For example, $\alpha_{i=2}$ may differ from $\alpha_{i=1}$ by about 1 to about 90 degrees, and $\alpha_{i=3}$ may differ from $\alpha_{i=2}$ by about 1 to about 90 degrees. As a result of such differences between angles $\theta_{i=1}$, $\theta_{i=2}$, and $\theta_{i=3}$, helical plies 331, 332, 333 may be helicoidally arranged relative to one another. Such a helicoidal arrangement may confer additional crash resistance to the container, and thus to PV 100. In a layer without interwoven tows, the interface between adjacent plies in the layer may be represented with a smooth surface substantially equivalent in shape to the shell. In a layer with interwoven tows, the interface between adjacent plies is uneven due to the tows of adjacent plies crossing each other. During a crash or impact event on the PV, one of the critical failures likely to occur in the fiber-reinforced layers is delamination damage, i.e. debonding between adjacent tows belonging to two adjacent plies. The presence of an uneven interface may constrain the delamination to deflect from its original plane. This mechanism may obstruct, reduce, or inhibit delamination propagation, hence leading to an increased impact resistance.

FIG. 3C schematically illustrates a cross-section of a fiber layer 343 including a plurality of helical plies 301-307 that are helicoidally arranged relative to one another so as to form a helicoidal lay-up. Each of helical plies 301-307 includes helical tows 311 within a resin matrix 312. In the illustrate example, the orientations of the tows 311 within respective plies 301-307 differ from one another (e.g., in a manner such as described with reference to FIG. 3A or 3B). The shape of fiber layer 343 is concentric with PV axis 320. The fiber layer 343 within cross-section illustrated in FIG. 3C may, for example, correspond to the fiber layer 122 within cross-section 180 of container 110 described with reference to FIGS. 1A-1B, the fiber layer within cross-section 280 of container 210 described with reference to FIG. 2A, the fiber layer within cross-section 281 of container 211 described with reference to FIG. 2B (projected into the volume illustrated in FIG. 3C), the fiber layer 422 within cross-section 480 of container 410 described with reference to FIGS. 4A-4B, the fiber layer 422' within cross-section 480' of container 410 described with reference to FIGS. 4A-4B, the fiber layer within cross-section 580 of container 510 described with reference to FIG. 5 (projected into the volume illustrated in FIG. 3C), fiber layer 622 within cross-section 680 of the first hollow shell 620 of the container described with reference to FIG. 6, fiber layer 622' within cross-section 680' of the first hollow shell 620 of the container described with reference to FIG. 6, fiber layer 622" within cross-section 680" of the first hollow shell 620 of the container described with reference to FIG. 6, the fiber layer within cross-section 780 of overwrapping 700 described with reference to FIG. 7, or the fiber layer within cross-section 880 of PV 800 described with reference to FIG. 8. Although seven helical plies 301-307 are illustrated in FIG. 3C, it will be appreciated that any of the fiber layers provided herein may include any suitable number of plies, e.g., may include about 1-20 plies, or about 2-15 plies, or about 3-10 plies, or about 4-8 plies. Optionally, each such ply may be helically wound, and as a further option the helically wound plies may be helicoidally arranged so as to provide one or more of the benefits such as described herein.

Figure 4A:
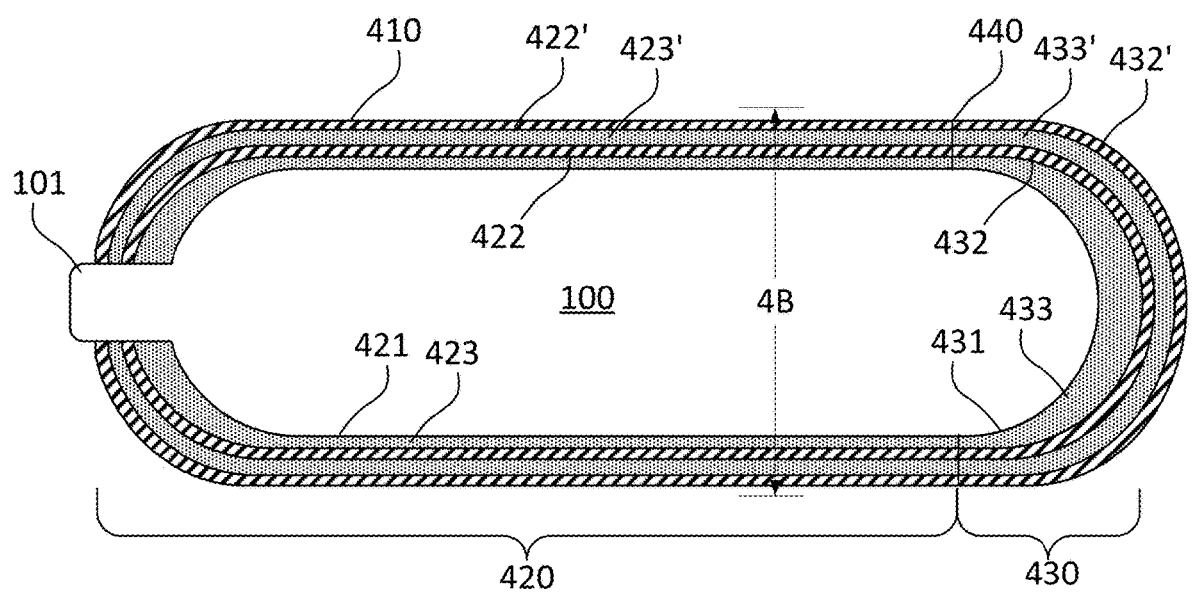
FIGS. 4A-4B schematically illustrate cross-sectional views of another example container for a PV.
Figure 4B:
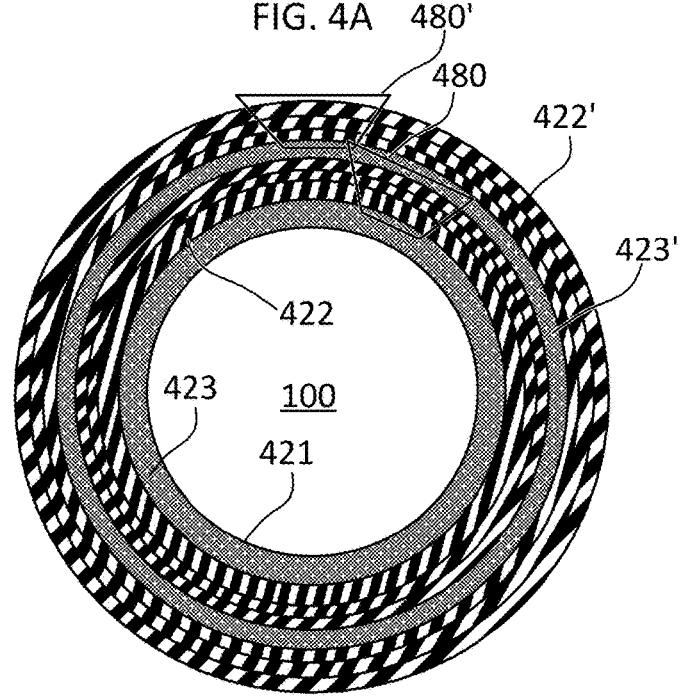

As noted further above with reference to FIGS. 1A-1B, the first hollow shell, the second hollow shell, or both the first and second hollow shells may include one or more additional layers. Illustratively, FIGS. 4A-4B schematically illustrate cross-sectional views of another example container 410 for a PV 100. Container 410 at least partially encloses PV 100, and in some examples substantially encloses or even fully encloses PV 100. In a manner similar to that described with reference to FIGS. 1A-1B, container 410 may include a first hollow shell 420 and a second hollow shell 430. First hollow shell 420 may include a first inner surface 421 configured to receive a first portion of PV 100. First hollow shell 420 may include a first fiber layer 422 that is substantially concentric with the first inner surface and is at least partially impregnated with a resin. First hollow shell 420 also may include a first energy dissipating material 423 that is substantially concentric with the first inner surface 421 and is disposed between the first inner surface 421 and the first fiber layer 422. In the nonlimiting example illustrated in FIGS. 4A-4B, first hollow shell 420 further may include an additional fiber layer 422' that is substantially concentric with the first inner surface 421, and an additional energy dissipating material 423 that is substantially concentric with the first inner surface and is disposed between the first fiber layer 422 and the additional fiber layer 423. The additional fiber layer 422' may be at least partially impregnated with a resin.

Second hollow shell 430 illustrated in FIGS. 4A-4B may include a second inner surface 431 configured to receive a second portion of PV 100. Second hollow shell 430 may include a second fiber layer 432 that is substantially concentric with the second inner surface 431 and is at least partially impregnated with a resin. Second hollow shell 430 also may include a second energy dissipating material 433 that is substantially concentric with the second inner surface and is disposed between the second inner surface and the second fiber layer. In the nonlimiting example illustrated in FIGS. 4A-4B, second hollow shell 420 further may include an additional fiber layer 432' that is substantially concentric with the second inner surface 431; and an additional energy dissipating material 433' that is substantially concentric with the second inner surface and is disposed between the second fiber layer and the additional fiber layer. The first and second hollow shells 420, 430 may be attachable to one another so as to define a volume for at least partially enclosing PV 100. In the nonlimiting example illustrated in FIG. 4A, first and second hollow shells 420, 430 meet one another at junction 440. Example structures for attaching hollow shells to one another are described with reference to FIGS. 2A-2B.

In the nonlimiting example illustrated in FIGS. 4A-4B, the first energy dissipating material 423 may define the inner surface 421 of the first hollow shell 420, and the second energy dissipating material 433 may define the inner surface 431 of the second hollow shell 430, in a similar manner to that described with reference to FIGS. 1A-1B. Additionally, the additional fiber layer 422' may define an outer surface of the first hollow shell 420, and the additional fiber layer 432' may define an outer surface of the second hollow shell 430. The additional fiber layer and additional energy dissipating material provided in each of the first and second hollow shells 420, 430 may provide multiple stages of impact resistance. So as to provide still further impact resistance, one or both of additional fiber layers 422', 432' may include multiple plies, e.g., helical plies which optionally may be helicoidally arranged, in a manner such as illustrated in FIG. 4B. Optionally, one or more sensors may be embedded within or between one or more layers of container 410. The sensor(s) may include, for example, a piezoelectric sensor configured to monitor impact, a fiber Bragg grating (FBG) configured to monitor for gas leaks, or the like. Such sensor(s) may be attached to an appropriate monitoring system, e.g., via a wired or wireless communication pathway. In one nonlimiting example, a FBG sensor will record and monitor alteration in the local strain filed. Such alterations are the results of the presence of damage. Therefore, by placing FGB sensors at various depth in the shell, it is possible to detect upon an impact event the depth of the damage in the crash box. This can be used to judge the durability of the crash box, the remaining protection potential and whether this requires replacement or repair. The FBG signal can be processed with onboard live (wired or wireless) monitoring and calibrated to trigger recording at the occurrence of specific alteration in the monitored signal. Depending on the type of signal alteration it is possible to distinguish different types of damage. For instance, a change in the peak of the recorded signal will suggest the passage of a delamination while a full truncation of the signal will indicate the formation of a translaminar crack (severe damage) that breaks the optical fiber carrying the FBG sensor. The presence of piezoelectric sensor, for instance in the form of a polymer, can be used both as leak detection indicator as well as damage indicator upon impact. The piezoelectric sensor would provide indication of local change in pressure. This can be originating form a leak from the PV as well as from impact loading generated pressure states. The entity of the transmission signal can be appropriately calibrated to correlate with potential leakages and severity and location of impact-damage events.

Additionally, or alternatively, in a manner such as illustrated in FIG. 4A, one or both of energy dissipating materials 423, 433 may be shaped so as to provide additional impact resistance. For example, in a manner such as illustrated in FIG. 4A, the first energy dissipating material 423 may be thicker within the spherical/bowl-shaped region configured to accept a first end of PV 100, and the second energy dissipating material 433 may be thicker within the spherical/bowl-shaped region configured to accept a second end of PV 100, thus providing additional cushioning against any impacts to those end regions. Alternatively, one or both of energy dissipating materials 423, 433 may have a substantially uniform thickness. Note that first energy dissipating materials 123, 133 described with reference to FIGS. 1A-1B similarly may be shaped in a manner such as described with reference to FIG. 4A, or may have a substantially uniform thickness.

Figure 5:
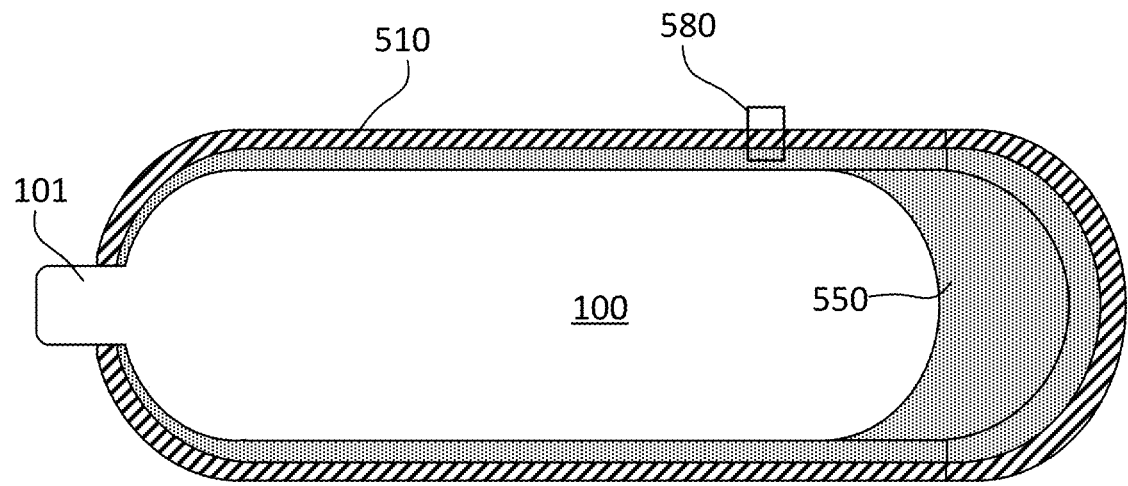
FIG. 5 schematically illustrates a cross-sectional view of another example container for a PV.

Additional and/or differently shaped energy dissipating material(s) may be included so as to further enhance impact resistance. For example, FIG. 5 schematically illustrates a cross-sectional view of another example container 510 for a PV 100. Container 510 may be configured similarly to other containers described herein (e.g., container 110, 210, 211, 410, or 610, details not specifically illustrated), and may contain additional material 550 for cushioning a corresponding end of PV 100 against impact. Such additional material may, for example, be helpful if one end of PV 100 is particularly vulnerable to impact, e.g., forms the leading edge of a fuel tank. This region of the PV is in fact more susceptible to low velocity impact damage, especially during transportation and handling of the PV.

Figure 6:
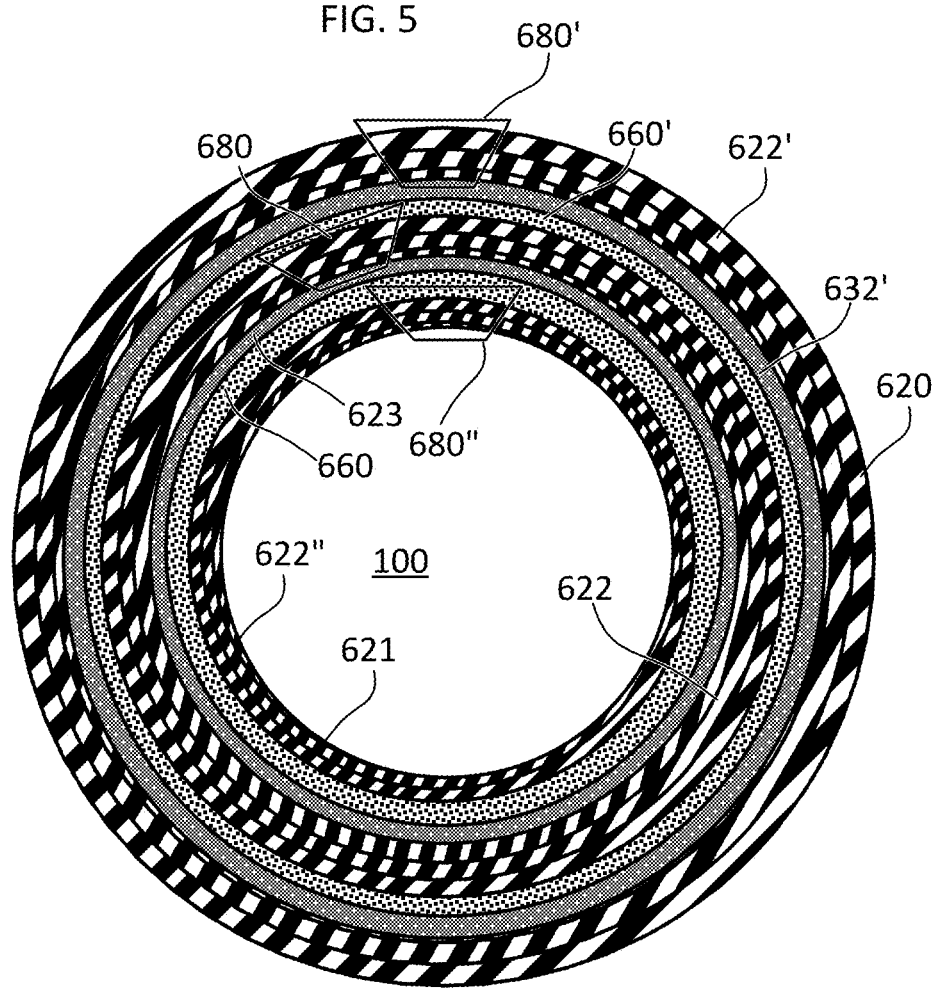
FIG. 6 schematically illustrates a cross-sectional view of another example container for a PV.

Still other configurations may be envisioned. For example, FIG. 6 schematically illustrates a cross-sectional view of another example container for a PV. While FIG. 6 illustrates a cross-section of first hollow shell 620 of a container, it will be appreciated that the second hollow shell of the container may be configured similarly, or may be configured differently. In the example shown in FIG. 6, first hollow shell 620 includes a first helicoidally braided layer or woven fabric 660, which may be located at any suitable location within the first hollow shell. Illustratively, the first helicoidally braided layer or woven fabric 660 may be disposed between the first inner surface 621 and a fiber layer 622. Additionally, or alternatively, a fiber layer 622" may define the inner surface of first hollow shell 620. Optionally, an energy dissipating layer 623 may be disposed internally, e.g., between first helicoidally braided layer or woven fabric 660 and fiber layer 622". The first hollow shell 620 (as well as other hollow shells provided herein) may include any suitable number and arrangement of layers, which together may inhibit damage to PV 100 resulting from a crash. Illustratively, hollow shell 620 may include additional helicoidally braided layer or woven fabric 660' disposed outside of fiber layer 622, additional energy dissipating layer 632' disposed outside of additional helicoidally braided layer or woven fabric 660', and additional fiber layer 622' disposed outside of additional energy dissipating layer 632' and defining an outer surface of the first hollow shell 620.

Braids produced using 2D or 3D techniques offer an interesting property of diameter variation associated with fiber angle variation. As fibers can slip within a tubular braid, this allows to expand or reduce the diameter of such braid. This property can be advantageous to create a structure having a helicoidal architecture with several layers effectively sleeved over one another so as to progressively expand the diameter of the structure and to slightly vary the fiber angle between and/or along layers to create a very small clocking angle variation between two adjacent braided layers. Such braided fiber reinforcing structures can also be provided in the form of a flat braided tape obtained from a tubular braid cut along a longitudinal direction and then laid open flat. The fiber angular orientation also varies with the width of the tape. Such braided tape can also be used to stack different layers of the same tape with slightly different fiber angle to create a structure having a helicoidal architecture. This property can also be found in woven fabrics which are skewed to modify the initial 90° angle between warp and weft which can be tuned to create a series of warp/weft angles with small angular variations from one fabric layer to the next one (such as a 5° clocking angle to align layers at 90°, 85°, 80°, 75° degrees, etc.) thus creating a structure having a helicoidal architecture.

In examples in which a fiber layer is disposed adjacent to a helicoidally braided layer or woven fabric, e.g., in a manner such as described with reference to FIG. 6, the resin of the fiber layer may at least partially impregnate the helicoidally braided layer or woven fabric. For example, if filament winding is used, both pre-impregnated tows as well as dry fiber tows may be used. This means that during the curing of the container part, part of the excess of resin of the pre-impregnated tows may flow into the dry tows. Depending on the excess of resin of the pre-impregnated tows, a specific degree of partial impregnation of the dry tows may be obtained. The full or partial impregnation of the helicoidally braided layer or woven fabric may enhance impact resistance and gas leak detection, e.g., using a sensor such as described elsewhere herein. Within a fiber reinforced layer, the alternation of plies with higher degree of fiber impregnation to plies with a lower degree of fiber impregnation leads to a variation in elastic properties between adjacent plies. These energy dissipation mechanisms, which include crack deflection, crack arrest and crack diffusion allow for a higher damage resistance and structural integrity of the fiber layer. The effectiveness of these mechanisms increases with the difference in elastic properties. Additionally, the presence of partially impregnated plies within a fiber layer will increase the flexibility of the shell. This will allow absorbance of a larger amount of energy under elastic deformation during an impact event before reaching the failure point.

It will be appreciated that in examples where a hollow shell includes two or more layers of a similar type (e.g., two or more fiber layers, two or more energy dissipating materials, or two or more helicoidally braided layer or woven fabrics), each layer of that type may have the same composition as one another, or the same material configuration as one another, or both the same composition and the same material configuration as one another. As used herein, the term "composition" is intended to refer to the material(s) that are included in an element. As used herein, the term "material configuration" is intended to refer to the physical arrangement of the materials that are included in an element. For example, two elements that have the same composition as one another may be made of substantially the same materials as one another. Those materials may have the same material configuration as one another, or may have different material configurations than one another. Or, for example, two elements that have different compositions than one another may have the same material configuration as one another, or may have different material configurations than one another. Illustratively, a given ply may include tows with different longitudinal orientations than one another; such tows may be part of the same elongated member as one another.

In one nonlimiting example, an inner fiber layer may include a helicoid having angles $\Delta\theta$ and a selected so as to arrest microcracking. Such inner fiber layer may help to protect the gas under pressure, while outer fiber layer(s) may have a different material configuration than the inner fiber layer. For example, the outer fiber layer may include a helicoid having angles $\Delta\theta$ and a selected so as to protect against bigger impacts, like a crash. The ranges of $\Delta\theta$ and a for increasing micro-cracking resistance may, for example, be between 30° and 90°. Additionally, to further enhance micro-cracking resistance, thin-ply tows may be used. The ranges of $\Delta\theta$ and a for protecting against larger impact should be between 1° and 25°. Additionally, any suitable combination of thin plies, standard plies, and/or thick plies may be used to achieve good impact resistance, reduce material costs and lay-up time. A smaller range of $\Delta\theta$ and $\alpha$ may allow for cracks to propagate via mainly braking matrix, following the local fiber orientation dictated by the helicoidal layup. This allows for a large quantity of energy to be dissipated along tortuous cracking patterns that leave fibers mostly undamaged, hence preserving the structural integrity of the shell under a severe impact event.

Figure 14A:
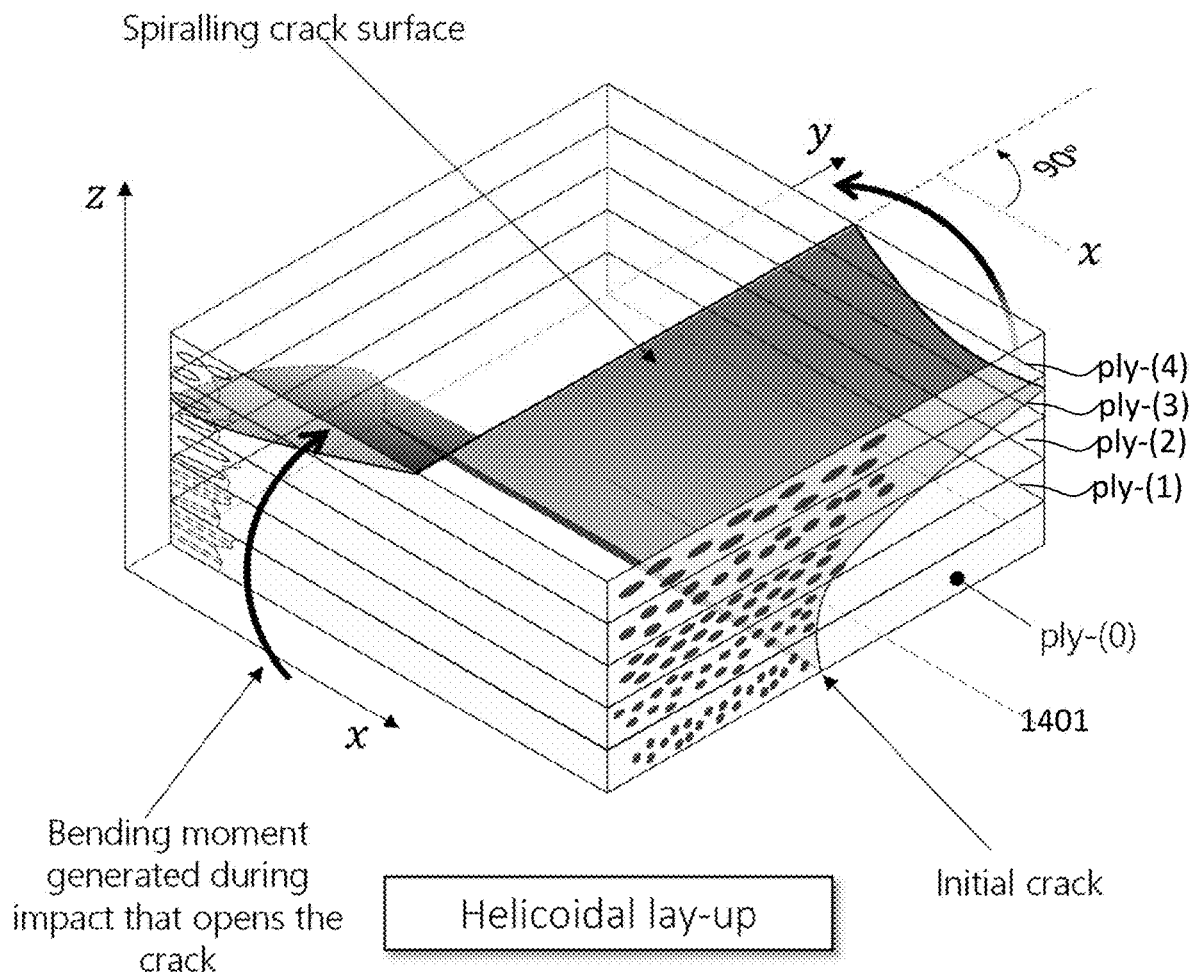
FIG. 14A schematically illustrates a model of crack propagation through an example helicoidal layup.
Figure 14B:
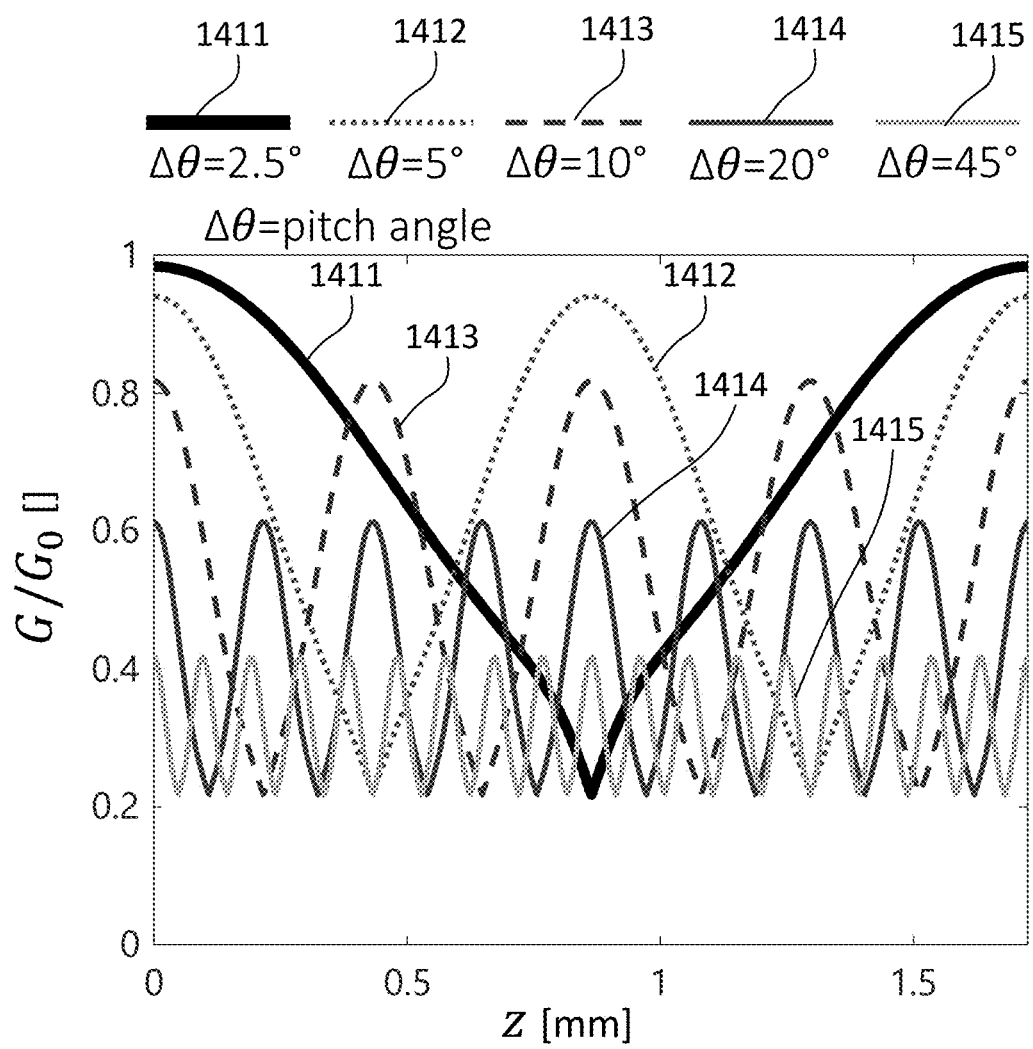
FIG. 14B is a plot of the energy release rate as a function of depth for different pitch angles in the model of FIG. 14A.

Such distinction in the ranges of $\Delta\theta$ and $\alpha$ follows an analytical model describing the evolution of the energy release rate (energy required for a crack to propagate in a certain material) at the front of a sprialling matrix crack growing in a helicoidally arranged lay-up. The equations describing the analytical model can be found in Mencattelli et al., "Realising bio-inspired impact damage-tolerant thin-ply CFRP Bouligand structures via promoting diffused sub-critical helicoidal damage," Composites Science and Technology, 182, 107684 (2019), the entire contents of which are incorporated by reference herein. The model describes the growth of twisting spiraling crack via the analysis of the local energy release rate (G) along the crack front, with the crack starting form an initially flat condition. A global reference system and a local one along the crack front fully define the crack front as it twists and kinks at any given time FIG. 14A schematically illustrates a model of crack propagation through an example helicoidal layup. FIG. 14B is a plot of the energy release rate as a function of depth for different pitch angles in the model of FIG. 14A. More specifically, FIG. 14A illustrates a spiraling crack that initiates within ply-(0) with fibers aligned along the x-axis corresponding to the 0° orientation and the longitudinal axis of the PV and then propagates through additional plies (1), (2), (3), and (4) in the z direction (perpendicular to the longitudinal axis of the PV, and in the radial direction of the PV). The surface of the crack may be described by the shaded curve 1401 illustrated in FIG. 14A. A closed-form solution to the problem can be obtained by assuming that: (i) the crack only breaks matrix, and the matrix is isotropic; (ii) the crack front remains straight; (iii) other failure mechanisms such as delaminations and fiber breaks do not occur; and (iv) the initially flat crack is opened in Mode I, i.e. the crack surfaces are opened with a displacement mainly applied along x, i.e. perpendicular to the crack surface. This opening condition is well representative of a translaminar crack that propagates radially through the PV. Following these assumptions is possible to obtain the equations for the evolution of the energy release rate at the front of the spiraling crack fully defined in the space x-y-z of the PV.

FIG. 14B illustrates the energy release rate ($G/G_0$, a dimensionless quantity) for pitch angles ($\Delta\theta$) of 2.5° (curve

1411), 5° (curve 1412), 10° (curve 1413), 20° (curve 1414), and 45° (curve 1415). For example, an helicoidal layer with A0=20° (curve 1414) was modeled to have plies stacked with the following orientations $\theta_i$ with respect to the longitudinal axis of the PV: [0°/20°/40°/60°/80°/100°/120°/140°/160°/180°/200°/ . . . /1440° ]. The helicoidal layer with $\Delta\theta$=5° (curve 1412) was modeled to have plies stacked with the following orientations $\theta_i$ with respect to the longitudinal axis of the PV: [0°/5°/10°/15°/20°/25°/30°/35°/40°/45°/50°/ . . . 715°/720° ]. The other layups (with other pitch angles) were modeled similarly. In this nonlimiting example the plies are made of carbon/epoxy UD thin-plies with a fiber areal weight of 20 g/m². Higher energy release rate means that micro-cracking will be promoted, allowing for diffuse damage and high energy dissipation. Lower energy release rate means a lower chance for the formation of micro-cracking. FIG. 14B is normalized by the value of the energy release rate ($G_0$) required to grow a flat crack parallel to the x-z plane illustrated in FIG. 14A. It may be seen in FIG. 14B that as pitch angle increases from 2.5° (curve 1411), to 5° (curve 1412), to 10° (curve 1413), to 20° (curve 1414), and to 45° (curve 1415), the energy release rate decreases. Accordingly, from FIG. 14B, it may be understood that by reducing $\Delta\theta$, the crack resistance (under dominant Mode I opening, such as under impact) to growing spiraling cracks decreases, facilitating the propagation of micro-cracking. This allows for larger amount of energy being dissipated while preserving the integrity of the fibers, and hence of the crash box. Increasing $\Delta\theta$, the crack resistance (under dominant Mode I opening) to growing spiraling cracks increases, delaying, reducing, or inhibiting the formation of microcracking and promoting the occurrence of catastrophic mechanisms of failure, such as delaminations and fiber breaks. Therefore, while larger $\Delta\theta$ allows for a better micro-cracking resistance to avoid leakage (inner layer), smaller $\Delta\theta$ allows to better resist impact and dissipate more energy at the impact location (outer layer). The inner and outer fiber layers also or alternatively may have different compositions so as to enhance their respective performance for the intended function. For example, the inner layer could be made by a tough material highly resistance to micro-cracking such as thin-ply carbon fiber embedded in toughened epoxy resin, while the external layer could be made of a fiber reinforcement with higher ductility than carbon fiber, such as glass fiber and/or aramid fibers or a combination of multiple fiber types.

Composite laminates including stacks of thin ply (TP) fiber-reinforced materials may exhibit better mechanical properties and improved resistance to micro-cracking and delamination when compared to same thickness parts made using thicker plies. TP fiber reinforced materials require higher applied loads to form micro-cracks in the matrix, longitudinally to the fibers (i.e. matrix splits). This increased micro-cracking resistance leads to improved delamination resistance. For example, commercially available aerospace unidirectional (UD) carbon/epoxy (C/E) pre-pregs are grade 190 (0.0073 in/ply) or grade 145 (0.0056 in/ply). TPUD is typically grade 75 (0.003 in/ply) or thinner. The grade specifies the nominal areal weight of carbon fiber in UD pre-preg measured in g/m². TP laminates allow for reduced minimum gauge and/or lighter weight equivalent performance structures. TP materials may include, for example, unidirectional (UD) tapes, non-crimp fabrics (NCF) or woven materials. Laminates may include ply stacks that are balanced (having about the same number of plus and minus orientation plies) and that are symmetric (that is, each ply above the midplane of the lay-up may have an identical ply (about the same material, thickness, and orientation) at about equal distance below the midplane).

It will be appreciated that any suitable materials, or combinations of materials, may be used in the present containers. For example, as noted above, the present fiber layers may be at least partially impregnated with a resin, e.g., a thermoset or thermoplastic resin such as known in the art. The resin optionally may be or include a fire retardant, so as to further reduce the risk of explosion in the event of an impact. In one nonlimiting example, the resin in the outer composite shell may be equipped with flame retardant material to reduce potential for flame damage in case of a leak resulting from damage to the PV.

The present fiber layers may include any suitable material or combination of materials. For example, fiber layers provided herein, independently of one another, may include at least one material selected from the group consisting of: ultra-high molecular weight polyethylene (UHMWPE), para-aramid, carbon, graphite, glass, aramid, basalt, ultra-high molecular weight polypropylene (UHMWPP), a natural material (e.g., hemp or flax), a metal, quartz, ceramic, and recycled fiber. The fibers within the present fiber layers may be expected to act as a load spreader and sharp impact stopper that may distribute the energy of an impact onto a wider surface of energy dissipating material, thus inhibiting damage to the PV.

In some examples, the present energy dissipating materials may include a foam. The foam may, for example, include polyvinylchloride (PVC), expandable polyurethane (PU), expanded polystyrene (EPS), expanded polypropylene (EPP), polyethylene (PE), aluminum foam, radially oriented scaffolding 3D printed material, honeycomb structure, closed cell foam, open cell foam, viscoelastic gel, or may define a metamaterial. Honeycomb structures are commercially available, e.g., aluminum honeycombs, or NOMEX® which is a flame-resistant meta-aramid material that is commercially available from DuPont de Nemours, Inc. (Wilmington, Del.). As used herein the term "metamaterial" is intended to refer to a cellular, hierarchical structure which has similar properties on different length scales, such as used in football helmets.

It will be appreciated that the first and second hollow shells of any of the containers provided herein may be used in any suitable method for protecting a PV. Such a method may, for example, include inserting a first portion of the PV into the first hollow shell of any of the present containers; inserting a second portion of the PV into the second hollow shell of that container; and attaching the first hollow shell to the second hollow shell.

Figure 7:
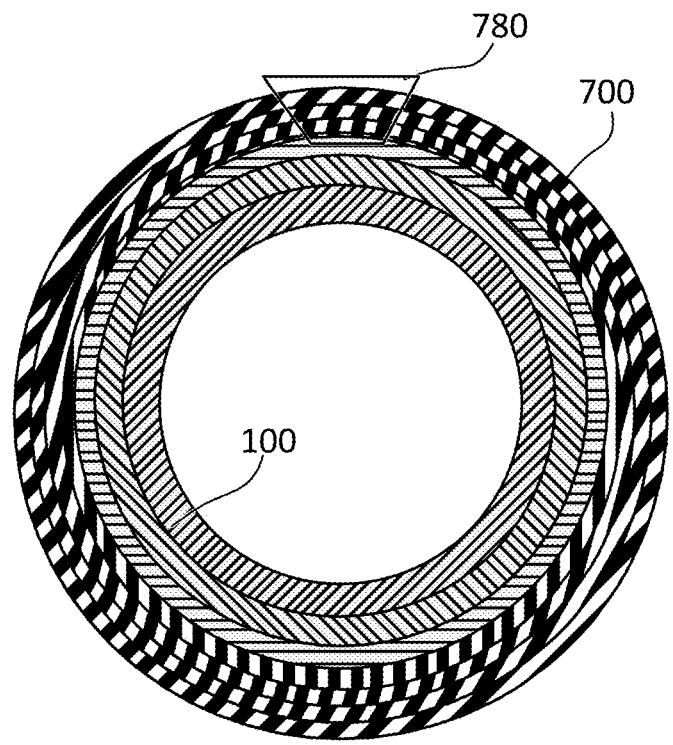
FIG. 7 schematically illustrates an example overwrapping for a PV.
Figure 8:
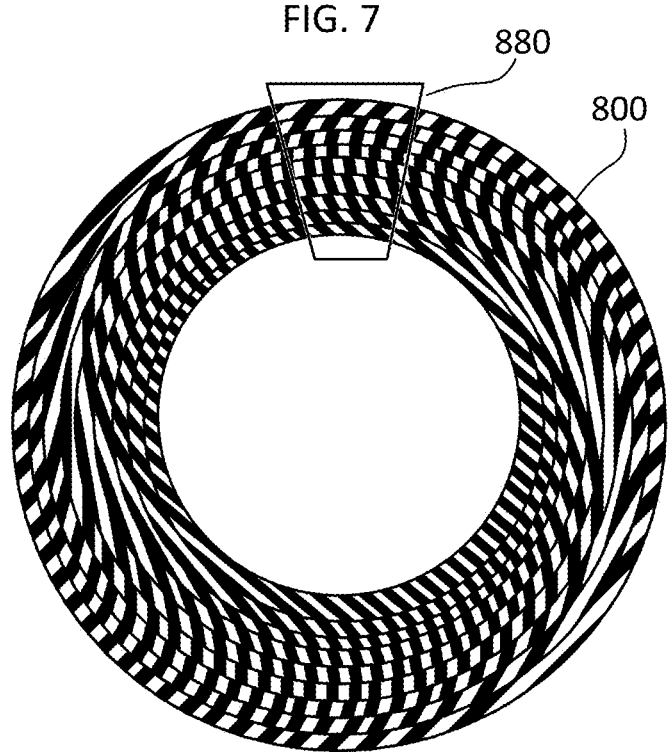
FIG. 8 schematically illustrates an example construction for a PV.

It will also be appreciated that the teachings herein may be used to protect PVs without necessarily creating a crash box that is separable from the PV. Illustratively, a method of protecting a PV may include overwrapping the pressure vessel with a plurality of helical plies, wherein the helical plies are helicoidally arranged relative to one another. FIG. 7 schematically illustrates an example overwrapping 700 for a PV 100 (internal plies of PV 100 shown). Overwrapping 700 may include with a plurality of helical plies, wherein the helical plies are helicoidally arranged relative to one another. Alternatively, the PV itself may be formed so as to include a plurality of helical plies, wherein the helical plies are helicoidally arranged relative to one another. FIG. 8 schematically illustrates an example construction for a PV. PV 800 may include a plurality of helical plies, wherein the helical plies are helicoidally arranged relative to one another. In a manner similar to that described with reference to FIG. 3A, a first one of the helical plies (i=1) of PV 800 or of overwrapping 700 may include a plurality of tows that are wound next to each other at an angle of $\theta_{i=1}$. A second one of the helical plies (i=2) may include a plurality of tows that are wound next to each other at an angle of $\theta_{i=2}$. Optionally, $\theta_{i=2}$ may differ from $\theta_{i=1}$ by about 1 to about 25 degrees, such that the plies define a helicoidal arrangement. Alternatively, in a manner similar to that described with reference to FIG. 3B, the helical plies may include interwoven tows. For example, a first one of the helical plies (i=1) may include tows that are interwoven at angles of $(+\alpha+\theta_{i=1})$ and $(-\alpha+\theta_{i=1})$. A second one of the helical plies (i=2) includes tows that are interwoven at angles of $(+\alpha+\theta_{i=2})$ and $(-\alpha+\theta_{i=2})$. Optionally, $\theta_{i=2}$ may differ from $\theta_{i=1}$ by about 1 to about 25 degrees. In one nonlimiting example, at least part of PV 800 may be created using helical layers conventionally wound around a sacrificial mandrel to resist the pressure load, and a second outer plurality of plies arranged helicoidally to resist impacts.

Figure 9:
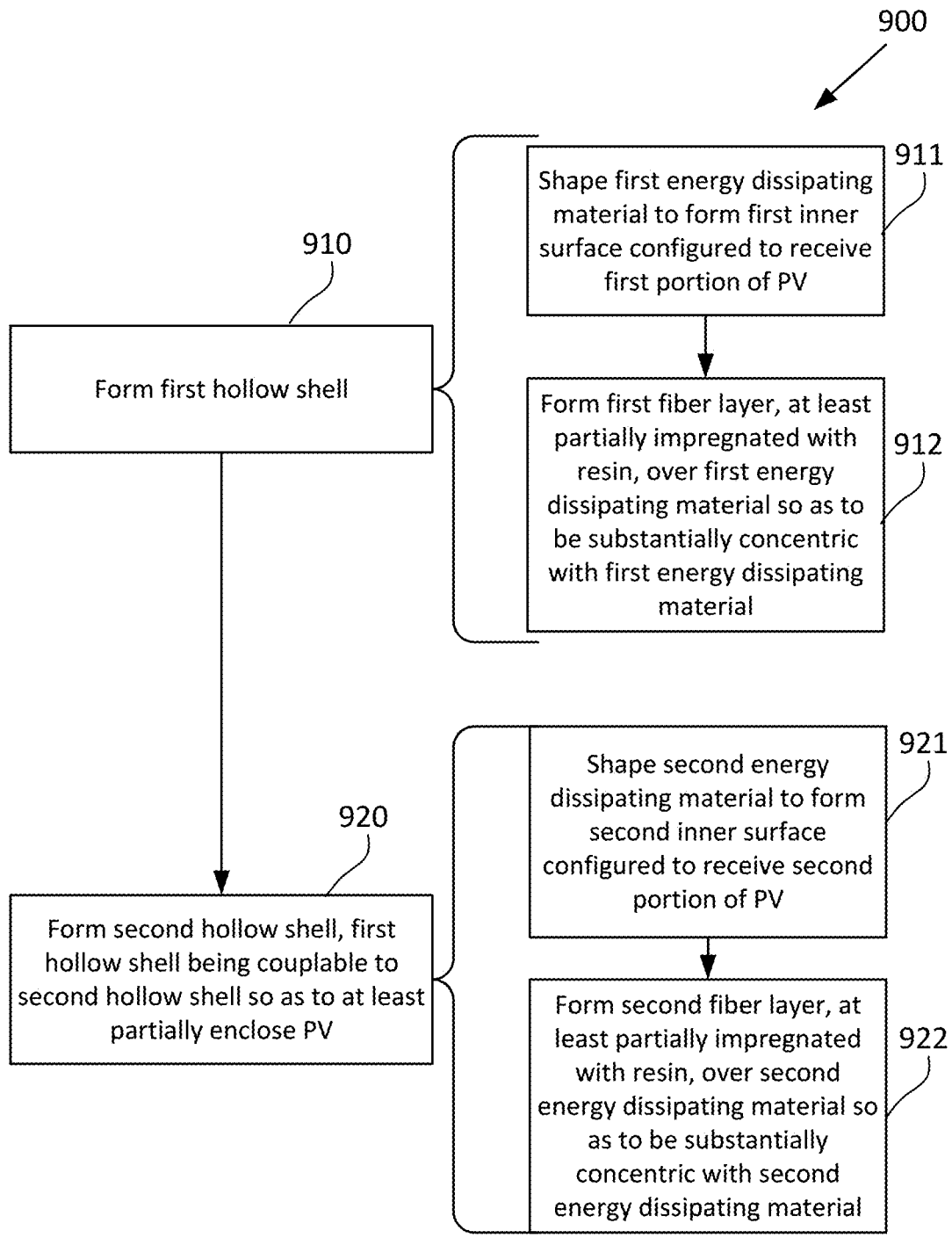
FIGS. 9-12 illustrate example flows of operations in respective methods for making a container for a PV.

The present containers, overwrappings for PVs, and PVs may be made using any suitable combination of operations. FIGS. 9-12 illustrate example flows of operations in respective methods for making a container for a PV. Referring now to FIG. 9, method 900 may include forming a first hollow shell (operation 910), and forming a second hollow shell, the first hollow shell being attachable to the second hollow shell so as to at least partially enclose the PV (operation 920). The first hollow shell may be formed using steps that include shaping a first energy dissipating material to form a first inner surface configured to receive a first portion of the pressure vessel (operation 911); and forming a first fiber layer, at least partially impregnated with a resin, over the first energy dissipating material so as to be substantially concentric with the first energy dissipating material (operation 912). The second hollow shell may be formed using steps that include shaping a second energy dissipating material to form a second inner surface configured to receive a second portion of the pressure vessel (operation 921); and forming a second fiber layer, at least partially impregnated with a resin, over the second energy dissipating material so as to be substantially concentric with the second energy dissipating material (operation 922). The operations of method 900 may be used to prepare containers such as described with reference to FIG. 1A-1B, 2A-2B, 4A-4B, 5, or 6.

Figure 10:
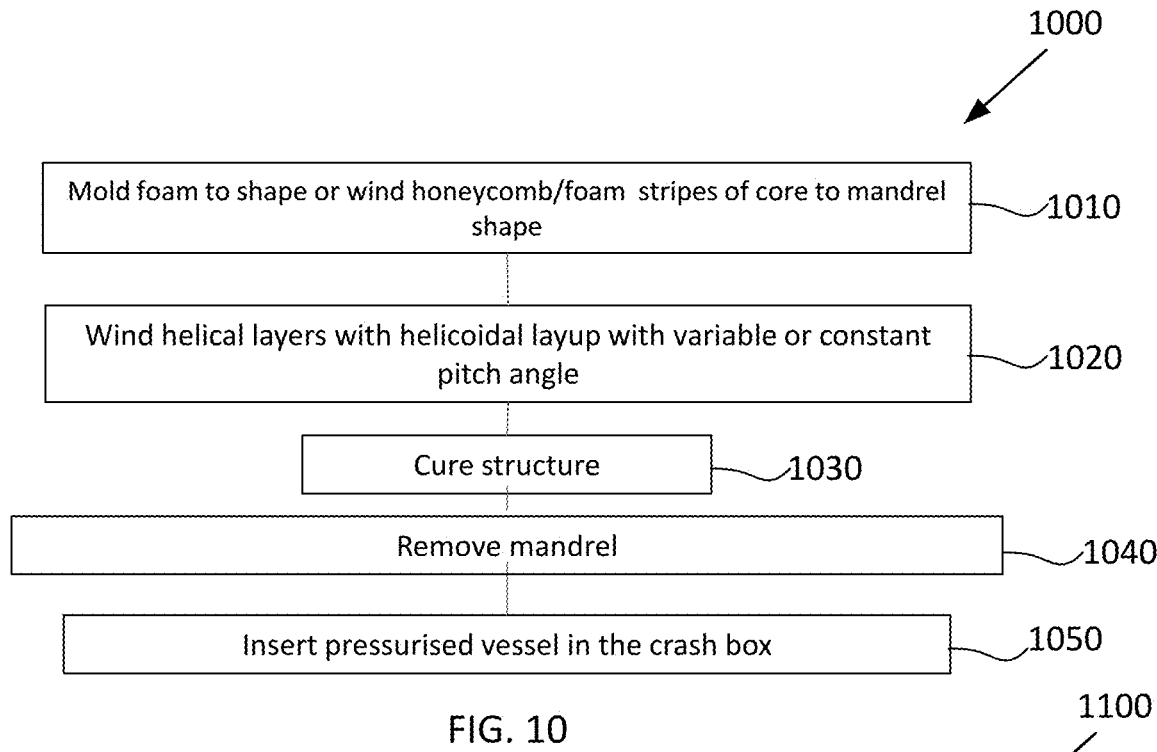
Figure 11:
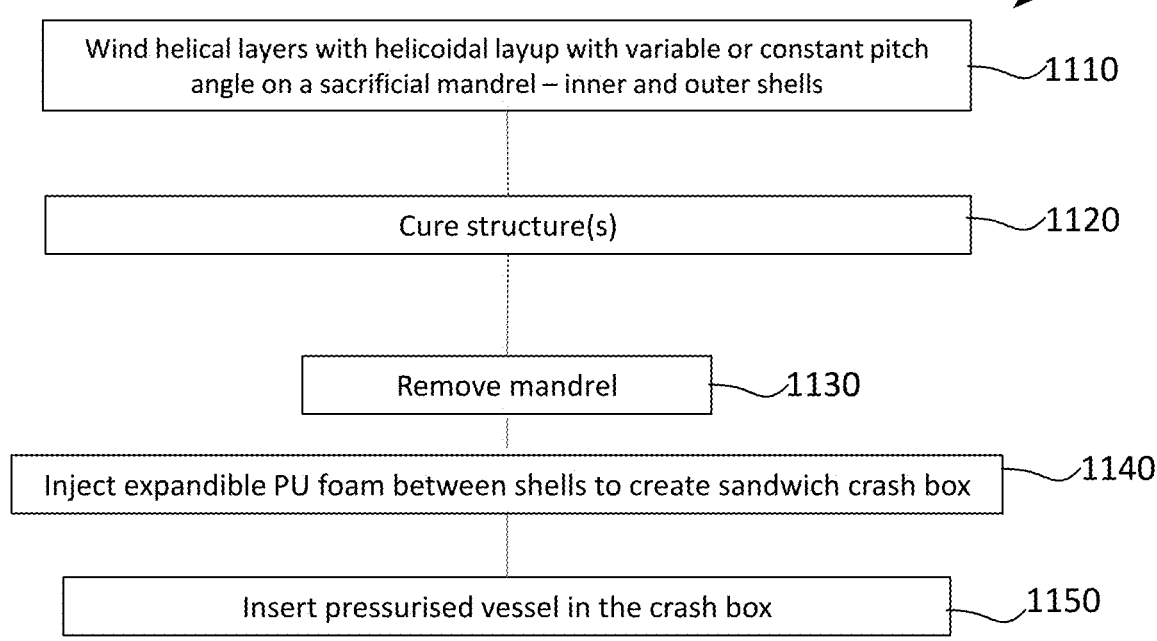
Figure 12:
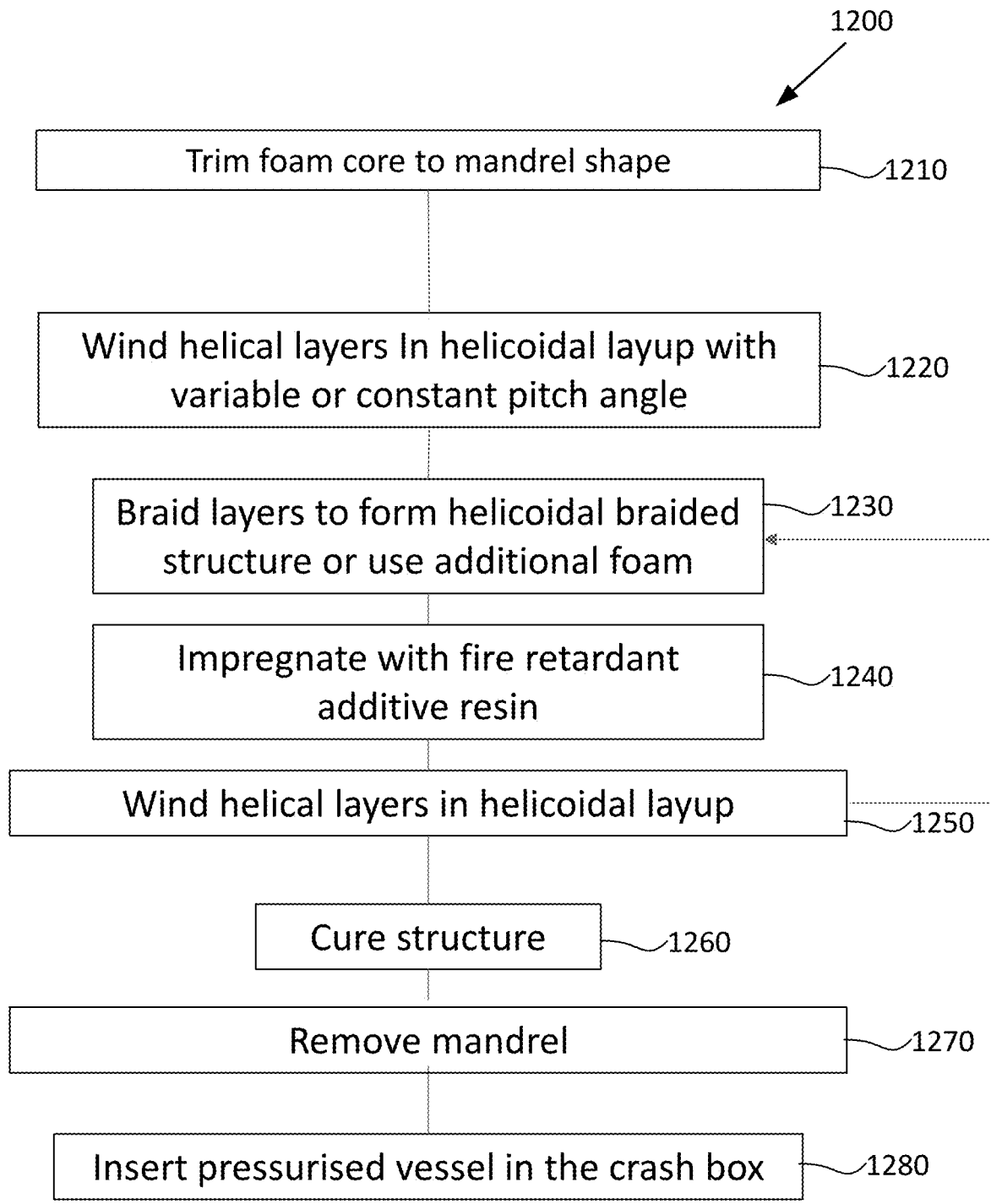

Illustratively, operations 911, 912, 921, and 922 may be performed using any suitable combination of operations such as illustrated in FIGS. 10-12. Referring now to FIG. 10, method 1000 may include forming an energy dissipating material (core) to a shaped mandrel, e.g., molding foam to a shape or winding honeycomb/foam strips of a core to a mandrel shape (operation 1010). Method 1000 may include winding, onto the energy dissipating material (e.g., foam), helical layers with a helicoidal layup with variable or constant pitch angle (operation 1020). The tows used to form the helical layers may be at least partially impregnated with a resin. Method 1000 may include curing the structure (operation 1030). Method 1000 may include removing the mandrel (operation 1040). Method 1000 may include inserting a PV into the resulting container (crash box) (operation 1050). Container 110 described with reference to FIGS. 1A-1B is a nonlimiting example of a container that may be made using operations such as described with reference to FIG. 10.

Referring now to FIG. 11, method 1100 may include winding helical layers with a helicoidal layup with variable or constant pitch angle on a sacrificial mandrel, to form inner and outer shells (operation 1110). Method 1100 may include curing the resulting structure(s) (operation 1120). Method 1100 may include removing the mandrel (operation 1130). Method 1100 may include injecting an energy dissipating material, e.g., expandable polyurethane (PU) foam, between the shells to create a sandwich crash box (operation 1140). Method 1100 may include inserting a PV into the resulting container (crash box) (operation 1150). The resulting container may include inner and outer surfaces defined by respective fiber layers, having an energy dissipating material disposed therebetween.

Referring now to FIG. 12, method 1200 may include trimming an energy dissipating material, e.g., foam core, to a mandrel shape (operation 1210). Method 1200 may include winding helical layers in a helicoidal layup with variable or constant pitch angle (operation 1220). Method 1200 may include braiding layers to form a helicoidal braided structure or using additional energy dissipating material, e.g., foam (operation 1230). Method 1200 may include impregnating the structure with a flame retardant additive resin (operation 1240). Method 1200 may include winding helical layers in a helicoidal layup (operation 1250). Operations 1230 through 1250 may be repeated any suitable number of times, e.g., one, two, three, or more than three times. Method 1200 may include curing the structure (operation 1260). Method 1200 may include removing the mandrel (operation 1270). Method 1200 may include inserting a PV into the resulting container (crash box) (operation 1280). The container described with reference to FIG. 6 is a nonlimiting example of a container that may be made using operations such as described with reference to FIG. 12.

Figure 13:
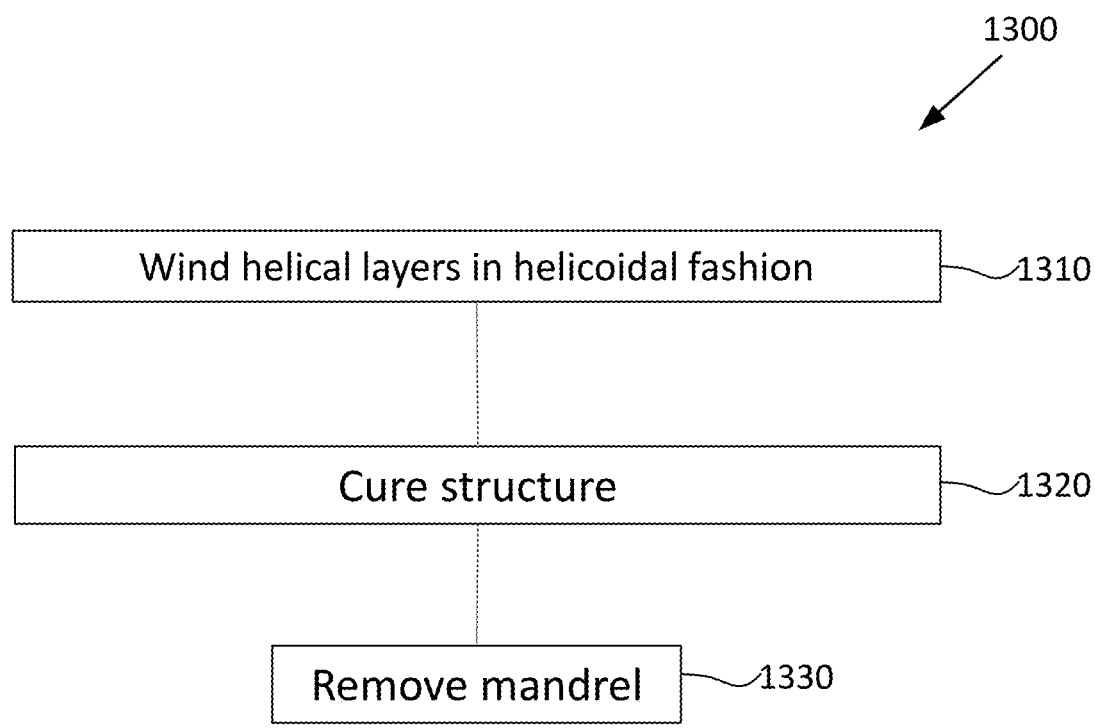
FIG. 13 illustrates an example flow of operations in a method for preparing a PV.

FIG. 13 illustrates an example flow of operations in a method 1300 for preparing a PV. Method 1300 may include winding helical layers in a helicoidal fashion (operation 1310). Method 1300 may include curing the structure (operation 1320). Method 1300 may include removing the mandrel (operation 1330). The PV described with reference to FIG. 8 is a nonlimiting example of a PV that may be made using operations such as described with reference to FIG. 13.

It will be appreciated that the use of a separated protective crash box (container), such as provided herein, may allow the weight and complexity of the PV to be reduced. Indeed, in previously known fiber-reinforced composite PVs including, the fibers may constantly be under a tensile stress due to the pressurized gas. With fiber-reinforced composite materials, such tensional state may lead to a reduction of the impact strength, e.g., in a manner such as described in Kamarudin et al., "Effect of high velocity ballistic impact on pretensioned carbon fibre reinforced plastic (CFRP) plates," IOP Conference Series: Materials Science and Engineering 165(1): 012005 (2017), the entire contents of which are incorporated by reference herein. The present inventors have recognized that previously known composite PVs are overbuilt to mitigate the tensile stress, for example, that overbuilding the PVs may increase impact performance while also increasing structural weight, hence leading to a non-efficient design. In comparison, because the separate protective containers provided herein need not be pressurized, the impact properties will not be degraded, and the material can be used more efficiently.

In some examples, such as described with reference to FIGS. 4A-4B and 6, the present containers may be constructed in a multi-core structure with alternating helicoidal sub-laminates and energy dissipating material (e.g., foam) layers. Such an arrangement may create periodic changes in elastic properties which are expected to function as a crack arrest mechanism for impact damage. This is expected to confer a multiple impact resistance to the container, which in turn is expected to extend the operating life of the PV.

In other examples, the multi-core structure may include alternating helicoidal sub-laminates and partially impregnated dry fiber reinforced layers. The partial impregnation may be achieved using an over impregnated filament wound helicoidal sub-laminates to bleed out the excess of resin and partially impregnate the dry fiber layers. This may create a leak detection system at different stages in the crash box as well as to improve impact performances. Additionally, or alternatively, a partially impregnated layer may provide a periodic change in elastic properties that promote crack arrest and higher damage tolerance.

Additionally, or alternatively, the energy dissipating material (e.g., foam core) may be equipped with piezoelectric/FBG sensing responsive to pressure/strain. The most external layers may be used to detect impact damage and its depth without the need of downtime to service the crash box. This may provide for live monitoring of the safety margin change of the crash box. The innermost layer of energy dissipating material, e.g., in contact with the PV, may include a sensor configured to detect eventual leaks. However, it will be appreciated that the container's absorption of any impact damage, rather than by the pressure vessel, may result in relatively little down time of the storage/fuel cell unit following such an impact.

In some examples, at least part of the inner shell of the container, closer to the pressure vessel, could be made of helicoidally arranged UHMWPE, para-aramid fibers, or other fibers disclosed herein. Such helicoidally arranged materials may be expected to provide a relatively large reduction in back face deflection during ballistic and high-velocity impacts, leading to smaller blunt during the impact event. This is expected to further reduce the likelihood of an impact piercing through the container and transferring the momentum to a localized region in the PV, further improving impact tolerance.

It should further be noted that helicoidal fiber arrangement may facilitate dissipation of energy from an impact through the formation of matrix damage, including spiraling matrix splits and delamination. Some examples herein may include embedded thermoplastic strips of fiber reinforced material or thermoplastic veils which may be used to "heal" such matrix damage. For example, heat and/or pressure may be applied to the damaged container, causing the thermoplastic material to melt and re-fill the cracked matrix. This may significantly extend the usable lifetime of the container.

Additionally, as described in greater detail above, the present containers may include two or more parts so as to readily accommodate the insertion of a PV. As such, the containers may readily be replaced if damaged (and optionally healed in a manner such as described above). Illustratively, two identical half shells may be assembled and connected around a sagittal plane defined by the PV shape, e.g., in a manner such as described with reference to FIG. 2A. Alternatively, the hollow shells may be formed to define an axisymmetric over vessel shape with a dome opening to slide the HPV inside, e.g., in a manner such as described with reference to FIG. 2B. In some examples, the container may be installed following pressurization as to inhibit a changing stress or load on the container that otherwise may reduce impact resistance.

While some examples of operations for preparing the present containers are described with reference to FIGS. 9-12, it will be appreciated that the present containers may be prepared using any suitable combination of techniques, including but not limited to resin transfer molding, infusion, compression press molding, fiber winding, and automated fiber placement. In a manner such as described with reference to FIG. 10, the fibers may be placed directly onto the energy dissipating material. Alternatively, in a manner such as described with reference to FIG. 11, the fibers may be placed onto a mandrel/male mold to form a shell, and the energy dissipating material (e.g., foam, such as expandable PU) may be injected inside the shell; a smaller male mandrel may be used to leave a radial space defining the foam liner thickness. In still other examples, preparing the container may include filament winding helicoidally fibrous layers over a closed cell foam axisymmetric mandrel to constitute the core of the structure, or over an axisymmetric mandrel to secure a high compaction of the plies and the energy dissipating material may be inserted after the fabrication of a shell. Additionally, or alternatively, the energy dissipating material may be 3D printed or milled or stamped. Additionally, or alternatively, the energy dissipating material may include or consist of filament wound flexible foam, which itself may be helically or helicoidally wound.

As will be apparent from examples such as described with reference to FIGS. 1A-1B and 2B, the use of an at least partially cylindrical central part with one or two openings may allow for sliding of the PV in and out from both sides. In some examples, caps may be configured to allow access to the inlet (neck) of the vessel and may at least partially cover connection pipe(s). A threaded end cap, e.g., such as described with reference to FIG. 2B, is one example of a manner in which a cap may be attached to an at least partially cylindrical central part.

While various illustrative embodiments of the invention are described above, it will be apparent to one skilled in the art that various changes and modifications can be made therein without departing from the invention. The appended claims are intended to cover all such changes and modifications that fall within the true spirit and scope of the invention.

What is claimed:

1. A container for a pressure vessel, the container comprising:
    a first hollow shell comprising a first inner surface configured to receive a first portion of the pressure vessel, the first hollow shell comprising:
        a first fiber layer that is substantially concentric with the first inner surface and is at least partially impregnated with a resin, and
        a first energy dissipating material that is substantially concentric with the first inner surface and is disposed between the first inner surface and the first fiber layer; and
    a second hollow shell comprising a second inner surface configured to receive a second portion of the pressure vessel, the second hollow shell comprising:
        a second fiber layer that is substantially concentric with the second inner surface and is at least partially impregnated with a resin, and
        a second energy dissipating material that is substantially concentric with the second inner surface and is disposed between the second inner surface and the second fiber layer,
    the first and second hollow shells being attachable to one another so as to define a volume for at least partially enclosing the pressure vessel.

2. The container of claim 1, wherein at least one of the first and second inner surfaces is at least partially cylindrical, at least partially spherical, or at least partially conical.

3. The container of claim 1, wherein at least one of the first and second inner surfaces is at least partially axisymmetric.

4. The container of claim 1, wherein the first and second hollow shells define a volume for fully enclosing the pressure vessel.

5. The container of claim 1, wherein the first hollow shell defines a first half-cylinder or bowl shape, and the second hollow shell defines a second half-cylinder or bowl shape.

6. The container of claim 1, wherein at least one of the first and second fiber layers comprises a plurality of helical plies.

7. The container of claim 6, wherein the helical plies are helicoidally arranged relative to one another.

8. The container of claim 7, wherein a first one of the helical plies (i=1) comprises a plurality of tows that are wound next to each other at an angle $\theta_{i=1}$ relative to an axis; and wherein a second one of the helical plies (i=2) comprises a plurality of tows that are wound next to each other at an angle of $\theta_{i=2}$ relative to an axis.

9. The container of claim 8, wherein $\theta_{i=2}$ differs from $\theta_{i=1}$ by about 1 to about 25 degrees.

10. The container of claim 7, wherein the helical plies comprise interwoven tows.

11. The container of claim 10, wherein a first one of the helical plies (i=1) comprises tows that are interwoven at angles of $(+\alpha_{i=1}+\theta_{i=1})$ and $(-\alpha_{i=1}+\theta_{i=1})$ relative to an axis; and, wherein a second one of the helical plies (i=2) comprises tows that are interwoven at angles of $(+\alpha_{i=2}+\theta_{i=2})$ and $(-\alpha_{i=2}+\theta_{i=2})$ relative to an axis.

12. The container of claim 11, wherein $\theta_{i=2}$ differs from $\theta_{i=1}$ by about 1 to about 25 degrees.

13. The container of claim 1, wherein the first energy dissipating material defines the inner surface of the first hollow shell, and wherein the second energy dissipating material defines the inner surface of the second hollow shell.

14. The container of claim 1, wherein the first fiber layer defines an outer surface of the first hollow shell, and wherein the second fiber layer defines an outer surface of the second hollow shell.

15. The container of claim 1, wherein the first hollow shell further comprises:
a third fiber layer that is substantially concentric with the first inner surface; and
a third energy dissipating material that is substantially concentric with the first inner surface and is disposed between the first fiber layer and the third fiber layer; and
wherein the second hollow shell further comprises:
a fourth fiber layer that is substantially concentric with the second inner surface; and
a fourth energy dissipating material that is substantially concentric with the second inner surface and is disposed between the second fiber layer and the fourth fiber layer.

16. The container of claim 1, wherein the first hollow shell comprises a first helicoidally braided layer or woven fabric that is disposed between the first inner surface and the first fiber layer, and wherein the second hollow shell comprises a second helicoidally braided layer or woven fabric that is disposed between the second inner surface and the second fiber layer.

17. The container of claim 16, wherein the resin of the first fiber layer at least partially impregnates the first helicoidally braided layer or woven fabric, or wherein the resin of the second fiber layer at least partially impregnates the second helicoidally braided layer or woven fabric.

18. The container of claim 1, wherein fibers of the first fiber layer and the second fiber layer independently comprise at least one material selected from the group consisting of: ultra-high molecular weight polyethylene (UHMWPE), para-aramid, carbon, graphite, glass, aramid, basalt, ultra-high molecular weight polypropylene (UHMWPP), a natural material, a metal, quartz, ceramic, and recycled fiber.

19. The container of claim 1, wherein at least one of the first and second energy dissipating materials comprises a foam.

20. The container of claim 19, wherein the foam comprises polyvinylchloride (PVC), expandable polyurethane (PU), expanded polystyrene (EPS), expanded polypropylene (EPP), polyethylene (PE), aluminum foam, radially oriented scaffolding 3D printed material, honeycomb structure, closed cell foam, open cell foam, viscoelastic gel, or defines a metamaterial.

21. The container of claim 1, wherein the first fiber layer comprises substantially the same composition or substantially the same material configuration as the second fiber layer.

22. The container of claim 1, wherein the first energy dissipating material comprises substantially the same composition or substantially the same material configuration as the second energy dissipating material.

23. The container of claim 1, further comprising:
a first fastener attached to the first hollow shell; and
a second fastener attached to the second hollow shell and configured to engage with the first fastener to attach the first hollow shell to the second hollow shell.

24. The container of claim 23, wherein the first fastener comprises a first thread and the second fastener comprises a second thread configured to rotatably engage with the first thread.

25. The container of claim 23, wherein the first fastener comprises a toggle latch, pipe clamp, or bolted joint.

26. A method of protecting a pressure vessel, the pressure vessel having first and second portions, the method comprising:
inserting the first portion of the pressure vessel into the first hollow shell of the container of claim 1;
inserting the second portion of the pressure vessel into the second hollow shell of the container of claim 1; and
attaching the first hollow shell to the second hollow shell.

27. The container of claim 1, further comprising a sensor embedded within or between one or more layers of the container.

28. The container of claim 27, wherein the sensor comprises a piezoelectric sensor configured to monitor impact or a fiber Bragg grating (FBG) configured to monitor for gas leaks.

29. A method of protecting a pressure vessel, the method comprising:
providing first and second hollow shells being attachable to one another so as to define a volume for at least partially enclosing the pressure vessel;
attaching the first and second hollow shells to one another so as to overwrap the pressure vessel with a plurality of helical plies, wherein the helical plies are helicoidally arranged relative to one another.

30. A method of making a container for a pressure vessel, the method comprising:
forming a first hollow shell using steps comprising:
shaping a first energy dissipating material to form a first inner surface configured to receive a first portion of the pressure vessel; and forming a first fiber layer, at least partially impregnated with a resin, over the first energy dissipating material so as to be substantially concentric with the first energy dissipating material; and forming a second hollow shell using steps comprising:
  shaping a second energy dissipating material to form a second inner surface configured to receive a second portion of the pressure vessel; and
  forming a second fiber layer, at least partially impregnated with a resin, over the second energy dissipating material so as to be substantially concentric with the second energy dissipating material;

the first hollow shell being attachable to the second hollow shell so as to at least partially enclose the pressure vessel.

* * * * *